United States Patent
O'Shea et al.

(10) Patent No.: US 10,305,553 B2
(45) Date of Patent: May 28, 2019

(54) ENCODING AND DECODING OF INFORMATION FOR WIRELESS TRANSMISSION USING MULTI-ANTENNA TRANSCEIVERS

(71) Applicant: Virginia Tech Intellectual Properties, Inc., Blacksburg, VA (US)

(72) Inventors: Timothy James O'Shea, Arlington, VA (US); Tugba Erpek, Arlington, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 16/012,691

(22) Filed: Jun. 19, 2018

(65) Prior Publication Data
US 2018/0367192 A1    Dec. 20, 2018

Related U.S. Application Data

(60) Provisional application No. 62/521,745, filed on Jun. 19, 2017, provisional application No. 62/534,813, filed on Jul. 20, 2017.

(51) Int. Cl.
*H04B 7/0413*    (2017.01)
*H04B 7/0452*    (2017.01)
(Continued)

(52) U.S. Cl.
CPC ............ *H04B 7/0452* (2013.01); *G06N 3/08* (2013.01); *H04B 7/0413* (2013.01); *H04B 7/0626* (2013.01)

(58) Field of Classification Search
CPC .. H04B 7/0413; H04B 7/0456; H04B 7/0632; H04B 7/15585; H04B 7/0452
(Continued)

(56) References Cited

U.S. PATENT DOCUMENTS

2002/0147032 A1*  10/2002  Yoon ............... H01Q 1/246
                                                455/562.1
2007/0092020 A1*  4/2007  Seki ............... H04L 1/0069
                                                375/267
(Continued)

OTHER PUBLICATIONS

G. E. Box, "Science and statistics," Journal of the American Statistical Association, vol. 71, No. 356, pp. 791-799, 1976.
(Continued)

*Primary Examiner* — Emmanuel Bayard
(74) *Attorney, Agent, or Firm* — Fish & Richardson P.C.

(57) ABSTRACT

Methods, systems, and apparatus, including computer programs encoded on computer storage media, for training and deploying machine-learned communication over multi-input-multi-output (MIMO) channels. One of the methods includes: determining a transmitter and a receiver, at least one of which implements a machine-learning network; determining a MIMO channel model; determining first information; using the transmitter to process the first information and generate first RF signals representing inputs to the MIMO channel model; determining second RF signals representing outputs of the MIMO channel model, each second RF signal representing aggregated reception of the first RF signals altered by transmission through the MIMO channel model; using the receiver to process the second RF signals and generate second information as a reconstruction of the first information; calculating a measure of distance between the second and first information; and updating the machine-learning network based on the measure of distance between the second and first information.

20 Claims, 12 Drawing Sheets

(51) Int. Cl.
*G06N 3/08* (2006.01)
*H04B 7/06* (2006.01)

(58) Field of Classification Search
USPC .............................. 375/267, 299, 347–350
See application file for complete search history.

(56) References Cited

U.S. PATENT DOCUMENTS

| | | | |
|---|---|---|---|
| 2007/0162819 A1* | 7/2007 | Kawamoto | H04B 7/0854 714/758 |
| 2007/0280485 A1* | 12/2007 | Villemoes | G10L 19/008 381/22 |
| 2007/0286304 A1* | 12/2007 | Kim | H04B 7/0452 375/267 |
| 2008/0268862 A1* | 10/2008 | Kent | H04B 7/0632 455/452.2 |
| 2009/0067528 A1* | 3/2009 | Loh | H04L 1/0015 375/267 |
| 2009/0154588 A1* | 6/2009 | Chen | H04L 1/0026 375/267 |
| 2011/0150113 A1* | 6/2011 | Oyman | H04L 1/0019 375/260 |
| 2012/0171970 A1* | 7/2012 | Muhammad | H04B 1/0458 455/84 |
| 2016/0174040 A1* | 6/2016 | Roberts | H04W 4/025 455/456.1 |
| 2016/0359647 A1* | 12/2016 | Chen | H04B 7/0413 |
| 2017/0163465 A1* | 6/2017 | Piazza | H03F 1/3258 |
| 2018/0123732 A1* | 5/2018 | Axmon | H04L 1/0005 |

OTHER PUBLICATIONS

M. H. Costa, "Writing on dirty paper," IEEE Transactions on Information Theory, vol. 29, No. 3, pp. 439-441, 1983.
S. M. Alamouti, "A simple transmit diversity technique for wireless communications," IEEE Journal on Selected Areas in Communications, vol. 16, No. 8, pp. 1451-1458, 1998.
V. Tarokh, N. Seshadri, and A. R. Calderbank, "Spacetime codes for high data rate wireless communication: Performance criterion and code construction," IEEE Transactions on Information Theory, vol. 44, No. 2, pp. 744-765, 1998.
E. Telatar, "Capacity of multi-antenna gaussian channels," European Transactions on Telecommunications, vol. 10, No. 6, pp. 585-595, 1999.
W. Yu, W. Rhee, S. Boyd, and J. M. Cioffi, "Iterative water-filling for gaussian vector multiple access channels," IEEE Transactions on Information Theory, vol. 50, No. 1, pp. 145-151, 2004.
D. Tse and P. Viswanath, Fundamentals of wireless communication. Cambridge University Press, 2005.
J. Mietzner, R. Schober, L. Lampe, W. H. Gerstacker, and P. A. Hoeher, "Multiple-antenna techniques for wireless communications—a comprehensive literature survey," IEEE Communications Surveys and Tutorials, vol. 11, No. 2, 2009.
R. Daniels and R. W. Heath, "Online adaptive modulation and coding with support vector machines," Proceedings of the IEEE European Wireless Conference, 2010.
A. Soysal and S. Ulukus, "Joint channel estimation and resource allocation for mimo systems—part i: Single-user analysis," IEEE Transactions on Wireless Communications, vol. 9, No. 2, 2010.
J. Wang, M. Wu, and F. Zheng, "The codebook design for MIMO precoding systems in LTE and LTE-A," International Conference on Wireless Communications Networking and Mobile Computing, 2010.
D. Kingma and J. Ba, "Adam: A method for stochastic optimization," arXiv preprint arXiv:1412.6980, 2014.
I. Goodfellow, Y. Bengio, and A. Courville, Deep learning. MIT press, 2016.
Y.-S. Jeon, S.-N. Hong, and N. Lee, "Blind detection for MIMO systems with low-resolution ADCs using supervised learning," arXiv preprint arXiv:1610.07693, 2016.
T. J. O'Shea, K. Karra, and T. C. Clancy, "Learning to communicate: Channel auto-encoders, domain specific regularizers, and attention," in 2016 IEEE International Symposium on Signal Processing and Information Technology (ISSPIT), 2016, pp. 223-228. DOI: 10 . 1109 / ISSPIT.2016.7886039.
S. Dorner, S. Cammerer, J. Hoydis, and S. ten Brink, "Deep learning-based communication over the air," arXiv preprint arXiv:1707.03384, 2017.
T. J. O'Shea and J. Hoydis, "An introduction to deep learning for the physical layer," CoRR, vol. abs/1702.00832, 2017. [Online]. Available: http://arxif.org/abs/1702.00832.

* cited by examiner

ENCODING AND DECODING OF INFORMATION FOR WIRELESS TRANSMISSION USING MULTI-ANTENNA TRANSCEIVERS

CROSS-REFERENCE TO RELATED APPLICATIONS

This application claims priority to U.S. Provisional Application Nos. 62/521,745 filed on Jun. 19, 2017 and 62/534,813 filed on Jul. 20, 2017. The disclosure of these prior applications are considered part of and are incorporated by reference in the disclosure of this application.

TECHNICAL FIELD

The present disclosure relates to machine learning and deployment of adaptive wireless communications using multi-antenna transceivers, and in particular for radio frequency (RF) signals.

BACKGROUND

Radio frequency (RF) waveforms are prevalent in many systems for communication, storage, sensing, measurements, and monitoring. RF waveforms are transmitted and received through various types of communication media, such as over the air, under water, or through outer space. In some scenarios, RF waveforms transmit information that is modulated onto one or more carrier waveforms operating at RF frequencies. In other scenarios, RF waveforms are themselves information, such as outputs of sensors or probes. Information that is carried in RF waveforms is typically processed, stored, and/or transported through other forms of communication, such as through an internal system bus in a computer or through local or wide-area networks.

SUMMARY

In general, the subject matter described in this disclosure can be embodied in methods, apparatuses, and systems for training and deploying machine-learning networks to communicate over RF channels, and specifically to encode and decode information for communication over RF channels using multi-antenna transceivers.

In one aspect, a method is performed by at least one processor to train at least one machine-learning network to communicate using multiple transmit antennas and multiple receive antennas over a multi-input-multi-output (MIMO) communication channel. The method includes: determining a transmitter and a receiver, at least one of which is configured to implement at least one machine-learning network; determining a MIMO channel model that represents transmission effects of a MIMO communication channel; determining first information for transmission over the MIMO channel model; using the transmitter to process the first information and generate a plurality of first RF signals representing inputs to the MIMO channel model; determining a plurality of second RF signals representing outputs of the MIMO channel model, each second RF signal of the plurality of second RF signals representing aggregated reception of the plurality of first RF signals having been altered by transmission through the MIMO channel model; using the receiver to process the plurality of second RF signals and generate second information as a reconstruction of the first information; calculating a measure of distance between the second information and the first information; and updating the at least one machine-learning network based on the measure of distance between the second information and the first information. Other implementations of this aspect include corresponding computer systems, apparatus, and computer programs recorded on one or more computer storage devices, each configured to cause at least one operably connected processor to perform the actions of the methods.

Implementations may include one or more of the following features. The method further including: processing the plurality of first RF signals to generate a plurality of first analog RF waveforms that are input into the MIMO channel model; receiving a plurality of second analog RF waveforms as outputs of the MIMO channel model, each second analog RF waveform of the plurality of second RF waveforms representing an aggregate reception of the plurality of first analog RF waveforms having been altered by the MIMO channel model; and processing the plurality of second analog RF waveforms to generate the plurality of second RF signals. The method where using the transmitter to process the first information and generate the plurality of first RF signals includes: determining, from the first information, a plurality of first information portions; and generating, based at least in part on the plurality of first information portions, the plurality of first RF signals with each first RF signal corresponding to a respective one of the plurality of first information portions, and wherein using the receiver to process the plurality of second RF signals and generate the second information as the reconstruction of the first information includes: determining, from the plurality of second RF signals, a plurality of second information portions with each second information portion corresponding to a respective one of the plurality of second RF signals; and generating, from the plurality of second information portions, the second information. The method further including determining channel state information (CSI) that indicates at least one of a state of the MIMO channel model, or spatial information or scheduling information regarding multiple users of the MIMO channel model; and based on determining the CSI, performing at least one of (i) using the transmitter to generate the plurality of first RF signals based on the CSI and the first information, or (ii) updating the MIMO channel model based on the CSI. The method where determining the CSI includes: using the receiver to generate the CSI based on the processing of the plurality of second RF signals representing the outputs of a MIMO communication channel. The method where determining the CSI includes: determining channel information regarding the at least one of a state of the MIMO channel model or spatial information or scheduling information regarding multiple users of a MIMO communication channel; and generating the CSI as a compact representation of the channel information by quantizing or classifying the channel information into one of a discrete number of states or finite number of bits as the CSI. The method where updating the at least one machine-learning network based on the measure of distance between the second information and the first information includes: determining an objective function including the measure of distance between the second information and the first information; calculating a rate of change of the objective function relative to variations in the at least one machine-learning network; selecting, based on the calculated rate of change of the objective function, a variation for the at least one machine-learning network; and updating the at least one machine-learning network based on the selected variation for the machine-learning network. The method where the measure of distance between the second information and the first information includes at least one of (i) a cross-entropy between the second information and the first information or other probabilistic measure of distance, or (ii) a geometric distance metric between the second information and the first information. The method where updating the at least one machine-learning network includes at least one of: (i) updating at least one encoding network weight or network connectivity in one or more layers of an encoder machine-learning network at the transmitter, (ii) updating at least one decoding network weight or network connectivity in one or more layers of a decoder machine-learning network at the receiver, or (iii) updating at least one network weight or network connectivity in one or more layers of a CSI embedding machine-learning network that is configured to generate the CSI. The method where the transmitter includes an encoder machine-learning network and the receiver includes a decoder machine-learning network that are jointly trained as an auto-encoder to learn communication over a MIMO communication channel, and wherein the auto-encoder includes at least one channel-modeling layer representing effects of the MIMO channel model or other impairments on transmitted waveforms. The method where the at least one channel-modeling layer represents at least one of (i) additive Gaussian thermal noise in the MIMO communication channel, (ii) delay spread caused by time-varying effects of the MIMO communication channel, (iii) phase noise or other distortions caused by transmission and reception over the MIMO communication channel or hardware, or (iv) offsets in phase, frequency, rate, or timing caused by transmission and reception over the MIMO communication channel. The method where the at least one channel-modeling layer is configured to generate $N_R$ outputs $\vec{y} = (\ldots, y_{N_R})$ that correspond to $N_R$ receive antennas, based on $N_T$ inputs $\vec{x} = (x_1, \ldots x_{N_T})$ that correspond to $N_T$ transmit antennas. The method where the at least one machine-learning network includes at least one of a deep dense neural network (DNN), a convolutional neural network (CNN), or a recurrent neural network (RNN) including parametric multiplications, additions, and non-linearities. The method where the MIMO channel model is configured to model at least one of a radio communication channel, an acoustic communication channel, or an optical communication channel. The method further including: training the at least one machine-learning network to communicate over a multi-user MIMO communication channel utilized by multiple users, and where the transmitter includes one or more encoder machine-learning networks, and the receiver includes one or more decoder machine-learning networks, where using the transmitter to process the first information and generate the plurality of first RF signals includes: using the one or more encoder machine-learning networks to (i) process at least a first portion of the first information to generate a first subset of the plurality of first RF signals; and (ii) process at least a second portion of the first information and generate a second subset of the plurality of first RF signals, where using the receiver to process the plurality of second RF signals and generate second information as a reconstruction of the first information includes: using the one or more decoder machine-learning networks to (i) process a first subset of the plurality of second RF signals and generate at least a first portion of the second information as a reconstruction of the first portion of the first information; and (ii) to process a second subset of the plurality of second RF signals and generate at least a second portion of the second information as a reconstruction of the second portion of the first information, where calculating the measure of distance between the second information and the first information includes: (i) calculating a first measure of distance between the first portion of the second information and the first portion of the first information, and (ii) calculating a second measure of distance between the second portion of the second information and the second portion of the first information, and where updating the at least one machine-learning network based on the measure of distance between the second information and the first information includes: based on the first measure of distance and the second measure of distance, updating at least one of (i) the one or more encoder machine-learning networks, or (ii) the one or more decoder machine-learning networks. The method where the one or more encoder machine-learning networks and the one or more decoder machine-learning networks are jointly trained as an auto-encoder to learn communication over a multi-user MIMO channel model representing the multi-user MIMO communication channel. Implementations of the described techniques may include hardware, a method or process, or computer software on a computer-accessible medium.

In another aspect, a method is performed by at least one processor to deploy a learned communication system for communicating using multiple transmit antennas and multiple receive antennas over a MIMO communication channel. The method includes: determining a transmitter and a receiver, at least one of which is configured to implement at least one machine-learning network that has been trained to communicate over a MIMO communication channel; determining first information for transmission over the MIMO communication channel; using the transmitter to process the first information and generate a plurality of first RF signals; transmitting the plurality of first RF signals using respective ones of a plurality of transmit antennas through the MIMO communication channel; receiving a plurality of second RF signals using respective ones of a plurality of receive antennas, each second RF signal of the plurality of second RF signals representing aggregated reception of the plurality of first RF signals having been altered by transmission through the MIMO communication channel; and using the receiver to process the plurality of second RF signals and generate second information as a reconstruction of the first information. Other implementations of this aspect include corresponding computer systems, apparatus, and computer programs recorded on one or more computer storage devices, each configured to cause at least one operably connected processor to perform the actions of the methods.

Implementations may include one or more of the following features. The method, further including: determining feedback information that indicates at least one of (i) a measure of distance between the second information and the first information, or (ii) channel state information (CSI) that indicates at least one of a state of the MIMO communication channel, or spatial information or scheduling information regarding multiple users of the MIMO communication channel; and updating at least one of the transmitter or the receiver based on the feedback information. The method, further including: processing the plurality of first RF signals to generate a plurality of first analog RF waveforms that are transmitted using the plurality of transmit antennas through the MIMO communication channel; receiving a plurality of second analog RF waveforms using the plurality of receive antennas as outputs of the MIMO communication channel, each second analog RF waveform of the plurality of second analog RF waveforms representing an aggregated reception of the plurality of first analog RF waveforms having been altered by the MIMO communication channel; and processing the plurality of second analog RF waveforms to generate the plurality of second RF signals. The method, where using the transmitter to process the first information and generate the plurality of first RF signals includes: determining, from the first information, a plurality of first information portions; and generating, based on the plurality of first information portions, the plurality of first RF signals with each first RF signal of the plurality of first RF signals corresponding to a respective one of the plurality of first information portions, and where using the receiver to process the plurality of second RF signals and generate the second information as the reconstruction of the first information includes: determining, from the plurality of second RF signals, a plurality of second information portions with each second information portion corresponding to a respective one of the plurality of second RF signals; and generating, from the plurality of second information portions, the second information. The method, further including: using the receiver to generate the CSI based on the processing of the plurality of second RF signals representing outputs of the MIMO communication channel; and providing the CSI as feedback to the transmitter, wherein using the transmitter to process the first information and generate the plurality of first RF signals includes generating the plurality of first RF signals based on the first information and based on the CSI. The method, where using the receiver to generate the CSI includes: determining channel information regarding the at least one of a state of the MIMO communication channel or spatial information or scheduling information regarding multiple users of the MIMO communication channel; and processing the channel information to generate the CSI as a compact representation of the channel information by quantizing or classifying the channel information into one of a discrete number of states or finite number of bits as the CSI. The method, where the receiver implements a CSI mapping based on results of training a CSI machine-learning network configured to generate the CSI based on the processing of the plurality of second RF signals. The method, where the transmitter implements an encoding mapping that is based on results of training an encoder machine-learning network and the receiver implements a decoding mapping that is based on results of training a decoder machine-learning network, and where the encoder machine-learning network and the decoder machine-learning network have been jointly trained as an auto-encoder to learn communication over a MIMO communication channel. The method, further performed to transmit and receive information over a multi-user MIMO communication channel utilized by multiple users, where the transmitter includes one or more encoders, where the receiver includes one or more decoders, where using the transmitter to process the first information and generate the plurality of first RF signals includes: using the one or more encoders to (i) process at least a first portion of the first information and generate a first subset of the plurality of first RF signals; and (ii) to process at least a second portion of the first information and generate a second subset of the plurality of first RF signals, and where using the receiver to process the plurality of second RF signals and generate second information as a reconstruction of the first information includes: using the one or more decoders to (i) process a first subset of the plurality of second RF signals and generate a first portion of the second information as a reconstruction of the first portion of the first information; and (ii) process a second subset of the plurality of second RF signals and generate a second portion of the second information as a reconstruction of the second portion of the first information. The method, where the one or more encoders are configured to implement encoding based on one or more encoder machine-learning networks and where the one or more decoders are configured to implementing decoding based on one or more decoder machine-learning networks, and where the one or more encoder machine-learning networks and the one or more decoder machine-learning networks have been jointly trained as an auto-encoder to learn communication over a multi-user MIMO communication channel. Implementations of the described techniques may include hardware, a method or process, or computer software on a computer-accessible medium.

Another aspect includes a system including: at least one processor; and at least one computer memory coupled to the at least one processor having stored thereon instructions which, when executed by the at least one processor, cause the at least one processor to perform operations to train at least one machine-learning network to communicate using multiple transmit antennas and multiple receive antennas over a multi-input-multi-output (MIMO) communication channel, the operations including: determining a transmitter and a receiver, at least one of which is configured to implement at least one machine-learning network; determining a MIMO channel model that represents transmission effects of a MIMO communication channel; determining first information for transmission over the MIMO channel model; using the transmitter to process the first information and generate a plurality of first RF signals representing inputs to a MIMO channel model; determining a plurality of second RF signals representing outputs of the MIMO channel model, each second RF signal of the plurality of second RF signals representing aggregated reception of the plurality of first RF signals having been altered by transmission through the MIMO channel model; using the receiver to process the plurality of second RF signals and generate second information as a reconstruction of the first information; calculating a measure of distance between the second information and the first information; and updating the at least one machine-learning network based on the measure of distance between the second information and the first information.

Implementations may include one or more of the following features. The system where the operations further include: processing the plurality of first RF signals to generate a plurality of first analog RF waveforms that are input into the MIMO channel model; receiving a plurality of second analog RF waveforms as outputs of the MIMO channel model, each second analog RF waveform of the plurality of second RF waveforms representing an aggregate reception of the plurality of first analog RF waveforms having been altered by the MIMO channel model; and processing the plurality of second analog RF waveforms to generate the plurality of second RF signals. The system where using the transmitter to process the first information and generate the plurality of first RF signals includes: determining, from the first information, a plurality of first information portions; and generating, based at least in part on the plurality of first information portions, the plurality of first RF signals with each first RF signal corresponding to a respective one of the plurality of first information portions, and wherein using the receiver to process the plurality of second RF signals and generate the second information as the reconstruction of the first information includes: determining, from the plurality of second RF signals, a plurality of second information portions with each second information portion corresponding to a respective one of the plurality of second RF signals; and generating, from the plurality of second information portions, the second information. The system where the operations further include: determining channel state information (CSI) that indicates at least one of a state of the MIMO channel model, or spatial information or scheduling information regarding multiple users of the MIMO channel model; and based on determining the CSI, performing at least one of (i) using the transmitter to generate the plurality of first RF signals based on the CSI and the first information, or (ii) updating the MIMO channel model based on the CSI. The system where determining the CSI includes: using the receiver to generate the CSI based on the processing of the plurality of second RF signals representing the outputs of a MIMO communication channel. The system where determining the CSI includes: determining channel information regarding the at least one of a state of the MIMO channel model or spatial information or scheduling information regarding multiple users of a MIMO communication channel; and generating the CSI as a compact representation of the channel information by quantizing or classifying the channel information into one of a discrete number of states or finite number of bits as the CSI. The system where updating the at least one machine-learning network based on the measure of distance between the second information and the first information includes: determining an objective function including the measure of distance between the second information and the first information; calculating a rate of change of the objective function relative to variations in the at least one machine-learning network; selecting, based on the calculated rate of change of the objective function, a variation for the at least one machine-learning network; and updating the at least one machine-learning network based on the selected variation for the machine-learning network. The system where the measure of distance between the second information and the first information includes at least one of (i) a cross-entropy between the second information and the first information or other probabilistic measure of distance, or (ii) a geometric distance metric between the second information and the first information. The system where updating the at least one machine-learning network includes at least one of: (i) updating at least one encoding network weight or network connectivity in one or more layers of an encoder machine-learning network at the transmitter, (ii) updating at least one decoding network weight or network connectivity in one or more layers of a decoder machine-learning network at the receiver, or (iii) updating at least one network weight or network connectivity in one or more layers of a CSI embedding machine-learning network that is configured to generate the CSI. The system where the transmitter includes an encoder machine-learning network and the receiver includes a decoder machine-learning network that are jointly trained as an auto-encoder to learn communication over a MIMO communication channel, and wherein the auto-encoder includes at least one channel-modeling layer representing effects of the MIMO channel model or other impairments on transmitted waveforms. The system where the at least one channel-modeling layer represents at least one of (i) additive Gaussian thermal noise in the MIMO communication channel, (ii) delay spread caused by time-varying effects of the MIMO communication channel, (iii) phase noise or other distortions caused by transmission and reception over the MIMO communication channel or hardware, or (iv) offsets in phase, frequency, rate, or timing caused by transmission and reception over the MIMO communication channel. The system where the at least one channel-modeling layer is configured to generate $N_R$ outputs $\vec{y} = \ldots, y_{N_R})$ that correspond to $N_R$ receive antennas, based on $N_T$ inputs $\vec{x} = (x_1, \ldots x_{N_T})$ that correspond to $N_T$ transmit antennas. The system where the at least one machine-learning network includes at least one of a deep dense neural network (DNN), a convolutional neural network (CNN), or a recurrent neural network (RNN) including parametric multiplications, additions, and non-linearities. The system where the MIMO channel model is configured to model at least one of a radio communication channel, an acoustic communication channel, or an optical communication channel. The system where the operations further include: training the at least one machine-learning network to communicate over a multi-user MIMO communication channel utilized by multiple users, and where the transmitter includes one or more encoder machine-learning networks, and the receiver includes one or more decoder machine-learning networks, where using the transmitter to process the first information and generate the plurality of first RF signals includes: using the one or more encoder machine-learning networks to (i) process at least a first portion of the first information to generate a first subset of the plurality of first RF signals; and (ii) process at least a second portion of the first information and generate a second subset of the plurality of first RF signals, where using the receiver to process the plurality of second RF signals and generate second information as a reconstruction of the first information includes: using the one or more decoder machine-learning networks to (i) process a first subset of the plurality of second RF signals and generate at least a first portion of the second information as a reconstruction of the first portion of the first information; and (ii) to process a second subset of the plurality of second RF signals and generate at least a second portion of the second information as a reconstruction of the second portion of the first information, where calculating the measure of distance between the second information and the first information includes: (i) calculating a first measure of distance between the first portion of the second information and the first portion of the first information, and (ii) calculating a second measure of distance between the second portion of the second information and the second portion of the first information, and where updating the at least one machine-learning network based on the measure of distance between the second information and the first information includes: based on the first measure of distance and the second measure of distance, updating at least one of (i) the one or more encoder machine-learning networks, or (ii) the one or more decoder machine-learning networks. The system where the one or more encoder machine-learning networks and the one or more decoder machine-learning networks are jointly trained as an auto-encoder to learn communication over a multi-user MIMO channel model representing the multi-user MIMO communication channel. Implementations of the described techniques may include hardware, a method or process, or computer software on a computer-accessible medium.

Another aspect includes a system including: at least one processor; and at least one computer memory coupled to the at least one processor having stored thereon instructions which, when executed by the at least one processor, cause the at least one processor to perform operations to deploy a learned communication system for communicating using multiple transmit antennas and multiple receive antennas over a MIMO communication channel, the operations including: determining a transmitter and a receiver, at least one of which is configured to implement at least one machine-learning network that has been trained to communicate over a MIMO communication channel; determining first information for transmission over the MIMO communication channel; using the transmitter to process the first information and generate a plurality of first RF signals; transmitting the plurality of first RF signals using respective ones of a plurality of transmit antennas through the MIMO communication channel; receiving a plurality of second RF signals using respective ones of a plurality of receive antennas, each second RF signal of the plurality of second RF signals representing aggregated reception of the plurality of first RF signals having been altered by transmission through the MIMO communication channel; and using the receiver to process the plurality of second RF signals and generate second information as a reconstruction of the first information.

Implementations may include one or more of the following features. The system where the operations further include: determining feedback information that indicates at least one of (i) a measure of distance between the second information and the first information, or (ii) channel state information (CSI) that indicates at least one of a state of the MIMO communication channel, or spatial information or scheduling information regarding multiple users of the MIMO communication channel; and updating at least one of the transmitter or the receiver based on the feedback information. The system, where the operations further include: processing the plurality of first RF signals to generate a plurality of first analog RF waveforms that are transmitted using the plurality of transmit antennas through the MIMO communication channel; receiving a plurality of second analog RF waveforms using the plurality of receive antennas as outputs of the MIMO communication channel, each second analog RF waveform of the plurality of second analog RF waveforms representing an aggregated reception of the plurality of first analog RF waveforms having been altered by the MIMO communication channel; and processing the plurality of second analog RF waveforms to generate the plurality of second RF signals. The system, where using the transmitter to process the first information and generate the plurality of first RF signals includes: determining, from the first information, a plurality of first information portions; and generating, based on the plurality of first information portions, the plurality of first RF signals with each first RF signal of the plurality of first RF signals corresponding to a respective one of the plurality of first information portions, and where using the receiver to process the plurality of second RF signals and generate the second information as the reconstruction of the first information includes: determining, from the plurality of second RF signals, a plurality of second information portions with each second information portion corresponding to a respective one of the plurality of second RF signals; and generating, from the plurality of second information portions, the second information. The system, where the operations further include: using the receiver to generate the CSI based on the processing of the plurality of second RF signals representing outputs of the MIMO communication channel; and providing the CSI as feedback to the transmitter, wherein using the transmitter to process the first information and generate the plurality of first RF signals includes generating the plurality of first RF signals based on the first information and based on the CSI. The system, where using the receiver to generate the CSI includes: determining channel information regarding the at least one of a state of the MIMO communication channel or spatial information or scheduling information regarding multiple users of the MIMO communication channel; and processing the channel information to generate the CSI as a compact representation of the channel information by quantizing or classifying the channel information into one of a discrete number of states or finite number of bits as the CSI. The system, where the receiver implements a CSI mapping based on results of training a CSI machine-learning network configured to generate the CSI based on the processing of the plurality of second RF signals. The system, where the transmitter implements an encoding mapping that is based on results of training an encoder machine-learning network and the receiver implements a decoding mapping that is based on results of training a decoder machine-learning network, and where the encoder machine-learning network and the decoder machine-learning network have been jointly trained as an auto-encoder to learn communication over a MIMO communication channel. The system, where the operations are further performed to transmit and receive information over a multi-user MIMO communication channel utilized by multiple users, where the transmitter includes one or more encoders, where the receiver includes one or more decoders, where using the transmitter to process the first information and generate the plurality of first RF signals includes: using the one or more encoders to (i) process at least a first portion of the first information and generate a first subset of the plurality of first RF signals; and (ii) to process at least a second portion of the first information and generate a second subset of the plurality of first RF signals, and where using the receiver to process the plurality of second RF signals and generate second information as a reconstruction of the first information includes: using the one or more decoders to (i) process a first subset of the plurality of second RF signals and generate a first portion of the second information as a reconstruction of the first portion of the first information; and (ii) process a second subset of the plurality of second RF signals and generate a second portion of the second information as a reconstruction of the second portion of the first information. The system, where the one or more encoders are configured to implement encoding based on one or more encoder machine-learning networks and where the one or more decoders are configured to implement decoding based on one or more decoder machine-learning networks, and where the one or more encoder machine-learning networks and the one or more decoder machine-learning networks have been jointly trained as an auto-encoder to learn communication over a multi-user MIMO communication channel. Implementations of the described techniques may include hardware, a method or process, or computer software on a computer-accessible medium.

Other implementations of this and other aspects include corresponding systems, apparatuses, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Figure 1:
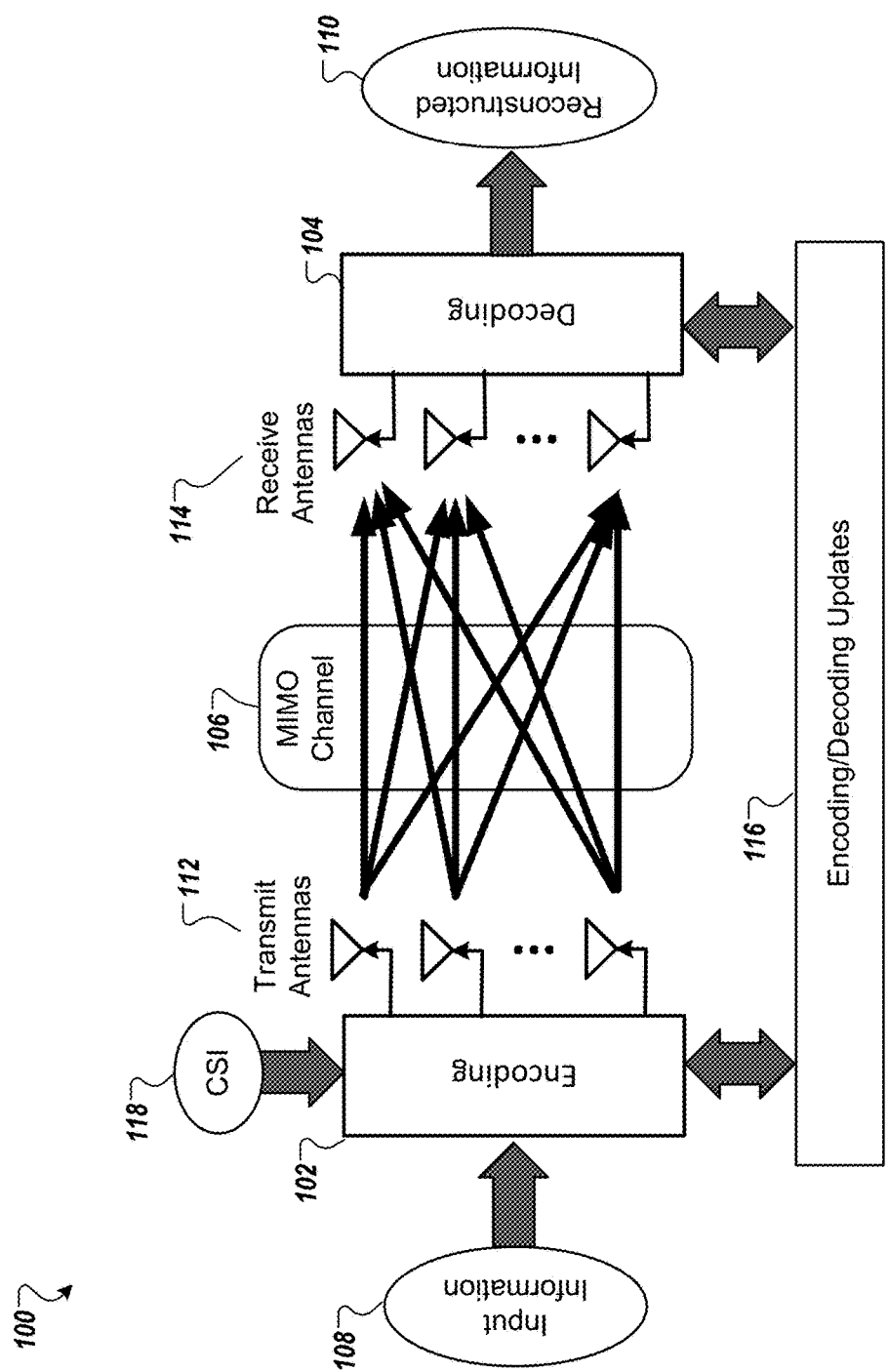
FIG. 1 illustrates an example of a radio frequency (RF) system that implements at least one machine-learning network to perform learned communication over a multi-input-multi-output (MIMO) channel using multi-antenna transceivers.

Systems and techniques are disclosed herein that enable machine learning and deployment of communication over an impaired RF channel using multiple-antenna transceivers. In some implementations, a transmitter implements multiple transmit antennas to send multiple signals over the RF channel, and a receiver implements multiple receive antennas to receive multiple signals over the RF channel. The number of transmit antennas at the transmitter and the number of receive antennas at the receiver may, in general, be different numbers or the same number, and may be at least one. In a wireless communications scenario (e.g., cellular, mesh network, optical, acoustic, etc.), each receive antenna receives a signal that represents an aggregated reception of the signals that were transmitted by the multiple transmit antennas, having been mixed together and altered by transmission through the RF channel. In general, such multi-antenna communications is referred to as multi-input-multi-output (MIMO) communications.

At least one machine-learning network may be implemented in at least one of the transmitter or the receiver of the MIMO communication system. For example, in some implementations, the transmitter includes a machine-learning encoder network that is trained to encode information as a signal that is transmitted over a MIMO channel using multiple transmit antennas, and/or the receiver includes a machine-learning decoder network that is trained receive a signal over the MIMO channel using multiple receive antennas and decode the signals to recover the original information.

In some implementations, the system may additionally or alternatively implement a machine-learning network to estimate channel state information (CSI) regarding the channel, such as a state of the radio transmission channel, or spatial information or scheduling information regarding multiple users of the MIMO channel model. Such CSI, for example, may be estimated at the transmitter based on a reverse channel, and/or may be estimated at the receiver and communicated to the transmitter via feedback. In many real-world scenarios, seeking compact representations of such CSI feedback may be an important objective, given limitations in delay and and/or bandwidth along with the increasing number of devices and antennas deployed in modern wireless systems. In such scenarios, implementations disclosed herein may enable a machine-learning network to learn compact representations of such CSI for various types of MIMO channel models to achieve such an objective.

As such, the present disclosure describes various machine-learning scenarios that may be implemented in a MIMO communication system, wherein one or more machine-learning network may be trained to learn to encode signals transmitted over the MIMO channel, and/or to decode signals received over the MIMO channel, and/or to estimate CSI to assist communications over the MIMO channel. The MIMO system may be an open-loop system in which the transmitter and receiver learn to communicate over a MIMO channel without the help of CSI feedback, or may be a closed-loop system in which the transmitter and receiver learn to communicate over a MIMO channel with the benefit of CSI feedback. Open loop may be an attractive option for broadcast or multicast channels, or for providing improved coverage range or resilience especially when considering mobility, while closed loop may be a more attractive option for dense urban or multi-user interference limited or more stable mobility models, where it can offer improved information density, multi-user capacity and throughput.

The at least one machine-learning network may be training may be designed to achieve various criteria in the MIMO communication system, such a low bit error rate, low power, low bandwidth, low complexity, low latency, performing well in particular regimes such as at a low signal to noise (SNR) ratio or under specific types of channel fading or interference, and/or other criteria. The results of training such machine-learning networks may then be utilized to deploy real-world communication scenarios to communicate various types of information over various types of RF communication media using multiple-antennas. In some implementations, further learning and adaptation of the machine-learning network(s) may be implemented during deployment in real-world systems, for example based on feedback information. These machine-learning networks may replace or augment one or more signal processing functions such as modulation, demodulation, mapping, error correction, CSI estimation and/or CSI feedback, or other components which exist in those systems today. When tuned after deployment, these systems may have the benefit in that they may improve the algorithms and encoding for specific deployment parameters such as the delay spread, reflectors, spatial distribution, user behavior, specific impairments and/or other statistical features or distribution of a specific area, specific hardware, cellular coverage area, or operating environment, thereby improving performance from the general case or previously trained models.

The disclosed implementations present a novel approach to how digital radio systems are designed and deployed for MIMO radio communications. For example, the disclosed implementations may help improve a typically slow and incremental process of MIMO radio signal processing engineering, and instead enable a new way of designing, constructing, and realizing MIMO radio communications systems. By implementing machine-learning networks that may be trained to learn suitable techniques for communication over different types of communication media, techniques disclosed herein offer various advantages, such as improved power, throughput, spectral efficiency, resiliency, and complexity advantages over presently available MIMO systems. In some scenarios, this can be especially important for MIMO communications channels which have very complex sets of effects which are hard to model, or hard to optimize for using other approaches especially when considering additional non-linear effects introduced by hardware, amplifiers, interferers or other effects.

In some implementations, a multi-antenna information representation transmitted from each antenna element may be learned using an optimization process (e.g., gradient descent or other solver) to minimize reconstruction loss of the information. As an example, the encoding process, over the air representation, and decoding process may be all jointly trained in an end-to-end optimization process by to obtain the best representation of each portion of the system. This optimization process may be designed to produce a MIMO transmission scheme which achieves one or more objectives, such as minimizing bit or codeword error rate, maximizing throughput, maximizing capacity, minimizing computational complexity to fit the encoding and decoding networks of interest, and/or optimizing the representation used to fit the specific MIMO channel conditions used in a MIMO channel impairment module of the training system. The scheme accordingly provides the ability of wireless systems to leverage, in an efficient and non-linear manner, spatially diverse multi-antenna channels in extremely computationally efficient methods that often outperform the state of the art linear analytic methods used in fourth generation wireless systems and beyond. This system and method therefore provides a powerful MIMO wireless transmission scheme which provides the basis on which future cellular wireless and other non-cellular wireless diversity systems (such as WLAN) are expected to be based in the coming years. Further this system and method may provide powerful techniques for scaling MIMO transmission schemes efficiently to different configurations which may have many antennas (e.g. Massive MIMO systems), wherein using the antennas effectively at low computational complexity has been a challenge to this point.

In general, the system may implement one or more machine-learning networks that are trained to learn suitable input-output mappings based on one or more objective criteria. For example, the machine-learning networks may be artificial neural networks. During training, the machine-learning networks may be adapted through selection of model architecture, weights, and parameters in the transmitter and/or the receiver to learn suitable mappings of inputs to outputs of the network. The machine-learning networks may be trained jointly, or may be trained in an iterative manner.

For example, in some implementations, the transmitter may implement an encoder machine-learning network and the receiver may implement a decoder machine-learning network. The encoder machine-learning network and decoder machine-learning network may be implemented as an autoencoder, in which the encoder network and decoder network are jointly optimized. In some implementations, the autoencoder may be trained by modeling the effects of an impaired MIMO channel as one or more channel-modeling layers, such as stochastic layers which may include regularization layers (e.g. regularization layers, transforming layers, variational layers/samplers, noise layers, mixing layers, etc.) in the autoencoder network or as another set of differentiable functions representing the behavior of a MIMO channel. The layers that model the MIMO channel may form a regularization function across random behavior of a MIMO channel.

In some implementations, in addition to as an alternative to implementing an encoder machine-learning network and/or a decoder machine-learning network, the system may implement a machine-learning network to estimate channel state information (CSI) about the MIMO channel. For example, such a CSI machine-learning network may be jointly trained with an encoder network and a decoder network in a single end-to-end autoencoder structure to achieve one or more objectives. In such a structure, an overall end-to-end system architecture for machine learning may be implemented. In other implementations, one or more of the encoder, the decoder, or the CSI estimator may instead be implemented with pre-designed communication components, and one or more other parts of the encoder, the decoder, and/or the CSI estimator may implement a machine-learning network to be trained and optimized around such pre-designed components.

During training, the one or more machine-learning networks may be trained to perform unsupervised, or partially supervised, machine learning to determine techniques for communicating over an impaired MIMO channel. Therefore, in some scenarios, rather than being reliant upon pre-designed systems for error correction, modulation, pre-coding, or shaping, etc., the disclosed implementations herein may adaptively learn techniques for encoding information into waveforms that are transmitted over a MIMO channel, and/or techniques for decoding received waveforms receiver over the MIMO into reconstructed information, and/or techniques to estimate and/or feedback CSI about the MIMO channel. The one or more machine-learning networks may be trained on real or simulated MIMO channel conditions. Systems that utilize results of training such machine-learning networks may further be updated during deployment over real-world MIMO channels, thus providing advantages in adapting to different types of wireless MIMO system requirements, and in some cases improving the throughput, error rate, complexity, and power consumption performance of such MIMO systems.

As such, regardless of the particular characteristics of MIMO channel or MIMO channel impairment, implementations disclosed herein may provide broadly applicable techniques for learning representations of information that enable reliable communication over impaired MIMO channels. Depending on the configuration of the training system and data sets and channel models used, such machine-learning communication techniques may specialize in performance for a narrow class of conditions, signal or MIMO channel types, or may generalize and optimize performance for a wide range of signal or MIMO channel types or mixtures of one or more signals or MIMO channels.

Implementations disclosed herein may be applied to a wide range of MIMO radio communication systems, such as cellular systems, satellite systems, optical systems, acoustic systems, tactical mesh network systems, emergency hand-held, broadcast, point-to-point, Wi-Fi, Bluetooth, and other forms of MIMO radio communications that undergo transmission impairments. MIMO channel impairments may include, for example, thermal noise, such as Gaussian-like noise, to more complex impairments such as interference, multi-path fading, impulse noise, spurious or continuous jamming, distortion, hardware effects, and other impairments of the MIMO channel. In some instances, the multiple-transceiver elements represent radio transmission on the same band from distinct antennas, but in other instances, they may represent transmission over distinct polarizations within the same band, or transmission of information over multiple distinct bands or mediums.

In some implementations, technique disclosed herein may be utilized to implement a multi-user MIMO system, wherein different information from multiple users (each utilizing multiple-antenna transceivers) are communicated over a common MIMO channel. The system may be trained to learn encoding and/or decoding techniques for each user that achieve a balance of competing objectives for the multiple users sharing the same MIMO channel. As one example of a multi-user implementation, in downlink scenarios where single base station transmits to multiple mobile users, a single multi-user encoder may be trained to encode information for the multiple users, and multiple decoders may be trained to decode information for each of the multiple users. As another example of a multi-user implementation, in uplink scenarios where multiple mobile users transmit to a single base station, multiple encoders may be trained to encode information for each of the multiple users, and a single decoder may be trained to collectively decode information for the multiple users. In another example implementation, where distributed MIMO is considered, multiple base stations may encode or decode information across the MIMO channel for one or multiple users within or across cells.

MIMO communications schemes are currently used within cellular technologies such as Long Term Evolution (LTE), and implement a variety of analytically derived methods such as beam forming, Alamouti coding, or other space-time block codes or spatial multiplexing techniques with the goal of efficiently transmitting information from a set of transmitting antennas to a set of receiving antennas. The use of MIMO transmission schemes helps make efficient use of multi-path and multi-user spatial propagation environments, and helps to improve throughput, efficiency and resiliency of information transmission. These schemes have been derived through various highly specific signal processing algorithms, which are not known to achieve optimal capacity in all situations. Especially in multi-user MIMO systems with non-linear effects, optimal capacity limits are currently not well defined or characterized. The system and method disclosed herein, in contrast, leverages a more adaptive method for learning a parametric encoding and decoding network, which can achieve improvements in resilience and both single and multi-user capacity and/or throughput by leveraging more degrees of freedom and more informed distributions over the wireless channel paths and effects, compared to the schemes noted above.

FIG. 1 illustrates an example of a radio frequency (RF) system 100 that implements at least one machine-learning network to perform learned communication over a multi-input-multi-output (MIMO) channel using multi-antenna transceivers. The system 100 includes a transmitter 102 and a receiver 104 that implement encoding and decoding techniques that were learned by machine learning networks that are trained to communicate over an impaired MIMO channel 106.

In some scenarios, referred to as "closed-loop" scenarios, the transmitter 102 also utilizes channel state information (CSI) 118 regarding the MIMO channel 106 to perform the encoding. By contrast, scenarios in which the transmitter 102 encodes the input information 108 without the benefit of any CSI 118 are referred to as "open-loop" scenarios. In closed-loop scenarios, the CSU 118 may, for example, be generated using techniques that were learned by a machine-learning network that was trained to estimate the CSI 118 and/or to communicate the CSI 118 to the transmitter 102.

However, implementations are not limited to performing all of the functions of encoding, decoding, and CSI estimation/feedback in the system 100 using machine-learning networks. Instead, some implementations may utilize machine-learning networks to perform only one or some of the techniques of encoding, decoding, and CSI estimation/feedback in system 100, and other parts of the system 100 may implement pre-designed communication techniques around which the machine-learning networks are trained to adapt for communication over the MIMO channel 106.

The transmitter 102 transform the input information 108 (and the CSI 118 in closed-loop scenarios) into multiple transmitted signals 112, each of which is transmitted by one of multiple transmit antennas over the MIMO channel 106. Analogously, the receiver 104 may receive multiple received signals 114, each of which is received by one of multiple receive antennas, and generate reconstructed information 110 that approximates the original input information 108. Additionally, for closed-loop scenarios, the CSI 118 may either be estimated by the transmitter 102 (e.g., using a reverse channel or reverse pilot signal), or may be estimated by the receiver 104 and communicated to the transmitter 102 (e.g., via a feedback channel).

The transmitter 102 and/or receiver 104 may be updated by an update process 116. The transmitter 102 and receiver 104 may be trained to achieve various types of objective functions, such as a measure of reconstruction error, a measure of computational complexity, bandwidth, latency, power, or various combinations therefor and other objectives. For example, the transmitter 102 and/or receiver 104 may implement one or more machine-learning networks that are updated by the update process 116. Further details of such a network structure are described below with reference to FIG. 3 and further details of training are described below with reference to FIG. 4.

In scenarios of deployment, the transmitter 102 and/or receiver 104 may implement techniques that were previously learned from training, or that may be (further) trained during deployment. The transmitter 102 and receiver 104 may be deployed in various application scenarios to perform communication, using the encoding and/or decoding and/or CSI representations that were learned during training. In some implementations, the transmitter 102 and/or receiver 104 may be further updated during deployment based on real-time performance results such as reconstruction error, power consumption, delay, etc. Further details of deployment are described below with reference to FIG. 7. In some implementations, feedback, such as CSI 118 or error feedback of loss functions, may be implemented via a communications bus or a protocol message within the wireless system, which can be used to update the transmitter 102 and/or receiver 104, along with information to help characterize the response of the MIMO channel 106.

The input information 108 and reconstructed information 110 may be any suitable form of information that is to be communicated over a MIMO channel, such as a stream of bits, packets, discrete-time signals, or continuous-time waveforms. Implementations disclosed herein are not limited to any particular type of input information 108 and reconstructed information 110, and are generally applicable to learn encoding and decoding techniques for communicating a wide variety of types of information over the MIMO channel 106.

The transmitter 102 and receiver 104 may leverage the multiple antennas in various ways to achieve advantages over single-antenna systems. For example, the transmitter 102 and receiver 104 may leverage the multiple antennas to achieve either spatial multiplexing gain or spatial diversity gain. The spatial multiplexing gain scenario involves splitting the input information 108 into multiple sub-streams that are transmitted simultaneously from the separate transmit antennas to improve efficiency, throughput or density. By contrast, the spatial diversity gain scenario involves sending the same input information 108 or different encodings thereof over the multiple transmit antennas, thus averaging out severe impairments effects of the MIMO channel, and improving overall performance, reliability or coverage.

In the spatial multiplexing gain scenario, the transmitter may determine, based on the input information 108, multiple information portions that each correspond to information to be transmitted over one of the multiple transmit antennas. Based on each information portion, the transmitter may generate a corresponding one of the multiple RF signals 112 for transmission over that transmit antenna. Analogously, at the receiver, each of the received RF signals 114 may be processed to generate multiple smaller-rate sub-streams information portions, which may then be combined to yield the reconstructed information 110.

In the spatial diversity gain scenario, the transmitter may transform the same input information 108 into the different RF signals 112 for transmission over the multiple transmit antennas. Analogously, at the receiver, the different received RF signals 114 may be processed collectively to generate the reconstructed information 110.

In some implementations, the transmitter 102 and receiver 104 employ one or more signal processing operations, which are suited to the type of RF communication domain. As examples, the transmitter 102 and/or receiver 104 may implement filtering, modulation, analog-to-digital (A/D) or digital-to-analog (D/A) conversion, equalization, subcarrier/slot assignment or other signal processing methods that may be suitable for a particular types of RF signals or MIMO communication domains. In some implementations, the transmitter 102 and/or receiver 104 may implement one or more transmit and receive antennas, and other hardware or software suitable for transmitting multiple signals 112 and receiving multiple signals 114 over the MIMO channel 106 using multiple antennas.

In such scenarios, as shown in the example of FIG. 1, the transmitted signal 112 and received signal 114 may represent actual RF waveforms that are transmitted and received over the MIMO channel 106 through multiple antennas. Thus, the transmitter 102 and receiver 104 may represent generalized mappings between information 108/110 and RF waveforms 112/114.

By contrast, in some implementations, the system 100 may implement signal processing and RF transmission/reception processes separately from the transmitter 102 and receiver 104. In such implementations, one or more signal transmission and/or signal reception components, such as filtering, modulation, A/D or D/A conversion, single or multiple antennas, etc., may be represented as part of the MIMO channel 106. The impairments in the MIMO channel 106 may therefore include transmitter/receiver effects, such as filtering impairments, additive noise, or other impairments in the transmitter and/or receiver components. Therefore, in such scenarios, the transmitted signals 112 and received signals 114 represent intermediate representations of information 108/110, and the channel 106 represents a general transformation of those intermediate representations of information to and from actual RF waveforms that are transmitted and received over an RF medium. For example, each of the transmitted signals 112 and received signals 114 may represent basis coefficients for RF waveforms, time-domain samples of RF waveforms, distributions over RF waveform values, or other intermediate representations that may be transformed to and from RF waveforms.

In scenarios of training, the reconstructed information 110 may be compared with the original information 108, and one or more machine-learning networks in the transmitter 102 and/or the receiver 104 may be trained (updated) based on results of the reconstruction. In some implementations, updating the machine-learning networks may also be based on other factors, such as computational complexity of the machine-learning networks (which can be measured, for example, by the number of parameters, number of multiplies/adds, execution time, Kolmogorov complexity, or otherwise), transmission bandwidth or power used to communicate over the channel 106, or various combinations thereof and other metrics.

In some implementations, the transmitter 102 and/or the receiver 104 may include artificial neural networks that consist of one or more connected layers of parametric multiplications, additions, and non-linearities. In such scenarios, updating the transmitter 102 and/or receiver 104 may include updating weights of the neural network layers, or updating connectivity in the neural network layers, or other modifications of the neural network architecture, so as to modify a mapping of inputs to outputs.

The transmitter 102 and/or the receiver 104 may be configured to encode, and/or decode, and/or generate CSI 118 using any suitable machine-learning technique. For example, the transmitter 102 may be configured to learn a mapping from input information 108 into a lower-dimensional or higher-dimensional representation as the transmitted signals 112 that are transmitted using multiple transmit antennas. Analogously, the receiver 104 may be configured to learn a reverse mapping from lower dimensional or higher-dimensional received signals 114 that are received by multiple receive antennas into the reconstructed information 110.

As an example, the mappings that are implemented in the transmitter 102 and receiver 104 may involve learning a set of basis functions for RF signals. In such scenarios, for a particular set of basis functions, the transmitter 102 may transform the input information 108 into a set of basis coefficients corresponding to those basis functions, and the basis coefficients may then be used to generate a corresponding one of the multiple transmitted RF waveforms 112 (for example, by taking a weighted combination of the basis functions weighted by the basis coefficients). Analogously, the receiver 104 may generate the reconstructed information 110 by generating a set of basis coefficients from a corresponding one of the received RF waveforms 114 (for example by taking projections of the received RF waveform onto the set of basis functions). The basis functions themselves may be any suitable orthogonal or non-orthogonal set of basis functions, subject to appropriate constraints on energy, amplitude, bandwidth, or other conditions.

In closed-loop scenarios (with CSI 118), the transmitter 102 may implement the encoding mapping to take into account the CSI 118, in addition to the input information 108, when generating the transmit signals 112. For example, the receiver 104 may implement a mapping from the receive signals 114 to CSI 118, and may communicate the CSI 118 back to the transmitter 102. As another example, the transmitter 102 itself may generate the CSI 118 (e.g., using outputs of a reverse channel or reverse pilot signal from the receiver 104 to the transmitter 102). The CSI 118 may be generated by a machine-learning network that has been trained to learn to represent information about the MIMO channel 106, or may be generated by pre-designed CSI estimation and/or CSI feedback techniques (e.g., a CSI precoding table used in LTE cellular communication systems).

In some scenarios, for example to reduce complexity, during deployment the transmitter 102 and/or receiver 104 may utilize simplified techniques that are based on results of training machine-learning networks. For example, the transmitter 102 and/or receiver 104 may utilize approximations or compact look up tables based on the learned encoding/decoding mappings. In such deployment scenarios, the transmitter 102 and/or receiver 104 may implement more simplified structures, rather than a full machine-learning network. For example, techniques such as distillation may be used to train smaller machine-learning networks which perform the same signal processing function. Further discussion of such deployment scenarios is provided in regards to FIG. 7, below.

In some implementations, the transmitter 102 and/or receiver 104 may include one or more fixed components or algorithms that are designed to facilitate communication over MIMO channels, such as expert synchronizers, equalizers, CSI quantizers, etc. As such, during training, the transmitter 102 and/or receiver 104 may be trained to learn encoding/decoding techniques that are suitable for such fixed components or algorithms.

RF signals that are transmitted and received by system 100 may include any suitable radio-frequency signal, such as acoustic signals, optical signals, or other analog waveforms. The spectrum of RF signals that are processed by system 100 may be in a range of 1 kHz to 300 GHz. For example, such RF signals include very low frequency (VLF) RF signals between 1 kHz to 30 kHz, low frequency (LF) RF signals between 30 kHz to 300 kHz, medium frequency (MF) RF signals between 300 kHz to 1 MHz, high frequency (HF) RF signals between 1 MHz to 30 MHz, and higher-frequency RF signals up to 300 GHz.

As an example of one possible application scenario, the system 100 may be utilized to perform communications from one or more base stations or access points to a mobile device (e.g. cell phone, laptop, Internet-of-Things (IoT) device, etc.) using one or more antennas for transmission and reception (i.e., a "downlink" channel in this example, from tower to mobile device). Here, information may be received from a cellular backhaul network or produced within a cellular tower to be transmitted to a cellular (or non-cellular) mobile device such as a cell phone, laptop, or IoT device. The parametric encoding network in a transmitter 102 is used by the cellular tower to encode information 108 into signals 112, which are the passed through radio transmit hardware and over wireless channel paths in the MIMO channel 106 to reach the receive MIMO antennas as received signals 114. Radio tuning and ADC may be used at the mobile device to recover samples information in the receive signals 114 from each receive antenna, which is then passed through a parametric decoding network in the receiver 104 in order to recover reconstructed information 110. In some implementations, location information may be used to inform the parametric decoding network in the receiver 104 or its weights in this process on the cellular mobile device.

As another example of an application scenario, the system 100 may be utilized to perform communications from a mobile device to one or more base stations or access points using one or more antennas for transmission and reception (i.e., an "uplink" channel from mobile devices to a base station or tower). In this example, a cellular mobile device uses the transmitter 102 to transmit encode information 108 and transmit signals 112 using multiple transmit antennas over wireless channel paths in the MIMO channel 106, and one or more cellular towers implementing the receiver 104 then receive the signals 114 using multiple receive antennas, and consume the information or pass it to a cellular backhaul network. In this example, the input information 108 may be processed by one or more parametric encoding networks in the transmitter 102 on the mobile device and may be passed through a digital to analog converter, mixer, and amplifier to be transformed into signals 112 for transmission from one or more MIMO antennas. These signals 112 emanate over wireless channel paths in the MIMO channel 106 to arrive at the multiple antennas at the receiver 104 on the cellular tower, which generates reconstructed information 110, for example by passing through a parametric decoder network.

In the two examples above, the cellular downlink system and the uplink system may be used together within a bi-directional cellular transmission protocol, such as in a cellular system or cellular standard. In closed-loop implementations, the mobile device and the tower in such a system may exchange channel state information (CSI), such as the current fade conditions which may be used within the parametric decoding process. This CSI may be quantized by obtaining a discretized encoding of the channel state information which can be compactly transmitted to the network or mobile device.

Figure 2:
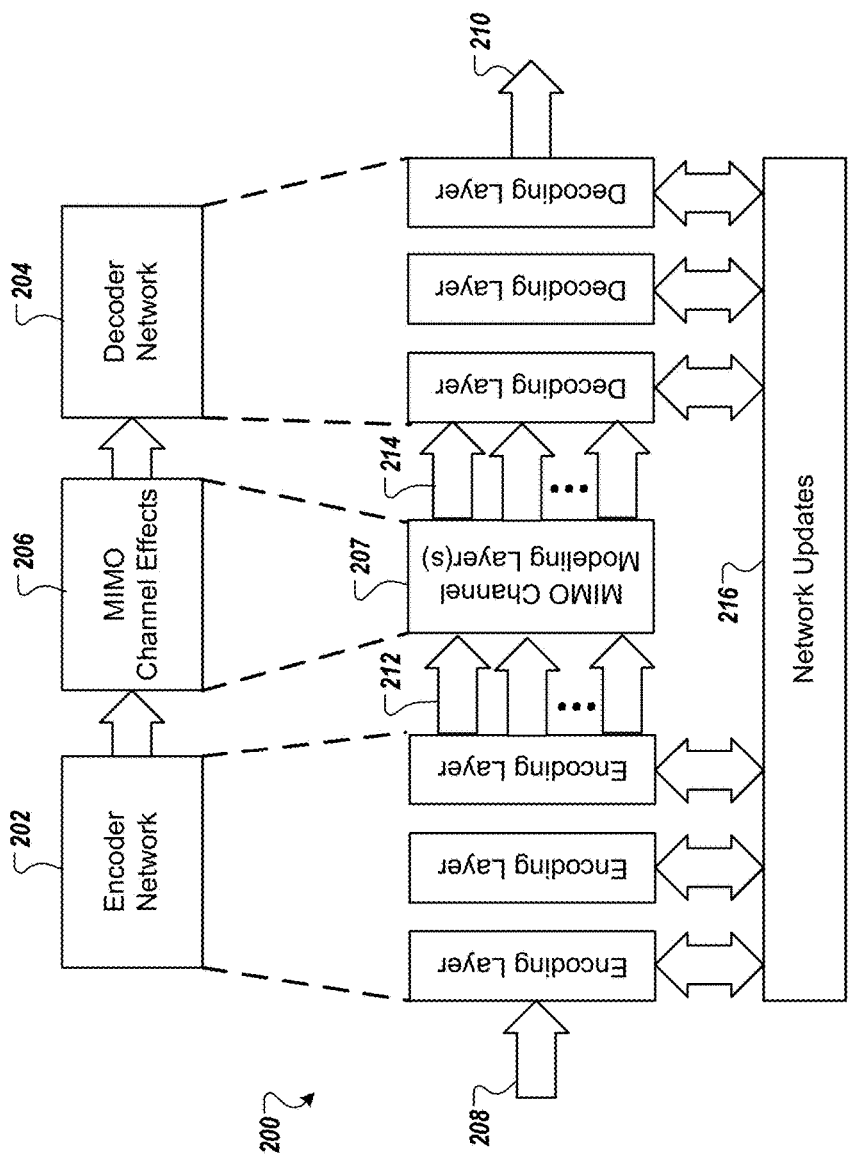
FIG. 2 illustrates an example of a network structure of a transmitter implementing machine-learning encoder and a receiver implementing a machine-learning decoder that may be implemented in an RF system to perform learned communication over MIMO channels using multi-antenna transceivers.

FIG. 2 illustrates an example of a network structure 200 of a transmitter implementing machine-learning encoder network and a receiver implementing a machine-learning decoder network that may be implemented in an RF system to perform learned communication over MIMO channels using multi-antenna transceivers.

The network structure 200 uses one or more layers that form an encoder network 202 and a decoder network 204. The output of each layer is used as input to the next layer in the network. Each layer of the network generates an output from a received input in accordance with current values of a respective set of parameters. For example, in some implementations, the encoder network 202 and/or decoder network 204 may include a plurality of networks that may be collectively or iteratively trained. As such, the network input 208 in FIG. 2 may be the original information (e.g., input information 108 and/or CSI 118 in FIG. 1, above), or may be an output of previous one or more layers in the encoder network 204. Analogously, the network output 210 may represent the reconstructed information (e.g., reconstructed information 110 in FIG. 1, above), or may be an input into subsequent one or more layers in the decoder network 204. In some instances, networks may not be sequential in nature, leveraging connections between various layers or neurons which bypass or route through a plurality of possible architectures.

During training, the encoder network 202 and/or decoder network 204 may be trained to learn encoding and/or decoding techniques for communicating over various types of MIMO channels. During deployment, the encoder network 202 and/or decoder network 204 (having been trained) may be implemented in an encoder and/or decoder. Alternatively, in some scenarios of deployment, a deployed encoder and decoder may utilize simplified encoding and decoding mapping based on results of training the encoder network 202 and/or decoder network 204. In the latter scenario, the encoder network 202 and/or decoder network 204 is only utilized during training, and provide learned encoding and/or decoding techniques that may be utilized in more simplified encoders and decoders that are deployed in real-world systems. Further discussion of such simplified deployment scenarios is provided in regards to FIG. 7, below.

In the example of FIG. 2, the encoder network 202 and decoder network 204 are implemented using a neural network structure 200 that is configured as an autoencoder. In the scenario of an autoencoder structure, the encoder and decoder are jointly trained to learn best representations of information for communication over the MIMO channel 206. In general, however, the network structure 200 may be configured as separate networks in the encoder network 202 and decoder network 204, which may be jointly or iteratively trained. During training, the encoder network 202 and/or decoder network 204 may be updated by a network update process 216.

In general, the encoder network 202 and/or decoder network 204 may include one or more collections of multiplications, divisions, and summations or other operations of inputs and intermediate values, optionally followed by non-linearities (such as rectified linear units, sigmoid function, or otherwise) or other operations (e.g., normalization), which may be arranged in a feed-forward manner or in a manner with feedback and in-layer connections (e.g., a recurrent neural network (RNN) where sequences of training information may be used in some instances). For example, a recurrent neural network may be a long-short term memory (LSTM) neural network that includes one or more LSTM memory blocks, or a quasi-recurrent neural network (QRNN) which combines elements of convolutional networks with recurrent networks.

Parameters and weight values in the network may be used for a single multiplication, as in a fully connected neural network (DNN), or they may be "tied" or replicated across multiple locations within the network to form one or more receptive fields, such as in a convolutional neural network, a dilated convolutional neural network, a residual network unit, or similar. A collection of one or more of these layers may constitute both the encoder 202 and the decoder 204, as shown in the example of FIG. 2. The specific structure for the networks may be explicitly specified at design time, or may be selected from a plurality of possible architecture candidates to ascertain the best performing candidate.

In some implementations, the encoder network 202 may include an output layer that includes a linear regression layer. The decoder network 204 may include at least one of (i) an output layer that includes a linear layer for regression of reconstructed information 210 in decoding the received RF signal 214, or (ii) a sigmoid or hard-sigmoid activation layer for probability regression or slicing of the received RF signal 214, or (iii) an activation of a combination of sigmoid expressions such as a SoftMax or hierarchical SoftMax which can compute a probabilistic expression such as a pseudo-likelihood or pseudo-probability of a discrete message, discrete portion of a message or one or more bits.

In some implementations, the encoder network 202 and/or decoder network 204 may include one or more layers that implement fixed communications algorithms, such as synchronization, equalization, etc. As such, in some scenarios, the encoder network 202 and/or decoder network 204 may be trained and deployed to learn suitable encoding and/or decoding techniques based on such fixed layers in the networks. Therefore, in general, the network structure 200 disclosed herein enables flexible design and training of the encoder network 202 and decoder network 204, for example by incorporating one or more existing communication algorithms that may be deployed in real-world systems in conjunction with machine-learning techniques to optimize around those fixed algorithms.

The example of FIG. 2 shows only one possible implementation of a network structure that may be implemented. In general, implementations are not limited to these specific types of layers, and other configurations of layers and non-linearities may be used, such as dense, fully connected, and/or DNN layers, including rectified linear-unit (ReLU), sigmoid, tan h, and others. The network structure 200 uses these layers to predict an output 210 for a received input 208. In some implementations, a linear regression layer may be implemented on the output of the encoder 202 and a linear layer on the output of the decoder 204 (for soft decoding), or a hard-sigmoid activation on the output of the decoder 204 (for hard decoding).

The multiple transmitted signals 212, created by the encoder 202, may be the actual RF waveforms in analog form, or may each be a series of radio samples in time, frequency, or any other signal representation basis, or may be intermediate representations (e.g., RF samples, basis coefficients, distributions over RF waveform values, etc.), for mapping the input information 208 into RF waveforms for transmission over the MIMO channel 206. Analogously, the multiple received signals 214 may be the actual received RF waveforms in analog form, or may be intermediate representations (e.g., RF samples, basis coefficients, distributions over RF waveform values, etc.), for mapping received RF waveforms into the reconstructed information 210. For example, in the scenario where the encoder 202 and decoder 204 are implemented as a variational auto-encoder, the multiple transmitted RF signals 212 and multiple received RF signals 214 may each represent distributions over RF waveform values.

The network structure 200 may also include one or more MIMO channel-modeling layers 207 (to model the MIMO channel effects 206), which may be stochastic layers (e.g., regularization layers). In some instances, the MIMO channel-modeling layers 207 may have at least one of weight regularization on convolutional network layer weights, activity regularization on dense network layer activations, or other stochastic impairments on activations or weights, such as dropout or noise. In some instances, or in addition to these, the layers may perform additional approximation of non-linearities present in a MIMO channel system (such as amplifier, antenna, or other RF component behaviors), or they may leverage variational layers such as sampling from a random distribution specified by or parameterized by weights or activations.

In some implementations, the MIMO channel-modeling layer(s) 207 may model impairment effects in the MIMO channel 206, which may be include various types of impairments in a MIMO RF medium and/or transmission and reception components of the multiple transmit and/or receive antennas in the MIMO system. Such MIMO channel-modeling layers 207 may be implemented during training of the network structure 200, in which case the MIMO channel-modeling layer(s) 207 may be implemented as one or more layers in an overall auto-encoder structure to represent impairment effects of the MIMO channel 206. During evaluation or deployment over actual MIMO channels, the MIMO channel 206 would be a real-world MIMO communication channel (including possible transmitter and/ or receiver effects), and the corresponding MIMO channel-modeling layers 207 would be removed from deployment, with only the network layers of the encoder 202 and the decoder 204 being deployed on the real MIMO channel 206.

In general, however, MIMO channel-modeling layers 207 may be implemented for various in different parts of the network structure 200 for various reasons, such as to prevent over-fitting, or to implement dropout, such as a penalty on the convolutional layer weights, to encourage minimum energy bases, or to implement a penalty on dense layer activations to encourage sparsity of solutions, or to improve generalization of the system to unseen conditions or channel states or behaviors.

In scenarios of training that use MIMO channel-modeling layer(s) 207 to model the MIMO channel 206, the network structure 200 may implement domain-specific regularization to model RF channel impairment effects. For example, the MIMO channel-modeling layer(s) 207 may model different types of impairments that occur during over-the-air transmission in a wireless RF system, such as additive Gaussian thermal noise, unknown time and rate of arrival, carrier frequency and phase offset, fading, hardware distortions, interference, and/or delay spread in the received signal.

Such MIMO channel-modeling layers 207, such as Gaussian noise and dropout, may be used during training and removed during evaluation or deployment over real channels. In radio communications, additive noise, such as Additive White Gaussian Noise (AWGN) may be modeled by adding a real-valued Gaussian random variable to different signal components, which may be signal basis functions (e.g., in-phase (I) and quadrature (Q) components), that are passed through the channel. In some implementations, a normalization layer may be implemented before the AWGN effects, which normalizes the average power incoming activations, for example to a normalized value equal to one. This form of constraint can be applied to the encoder 202 to enforce a wide range of possible waveform design criteria, such as a maximum power, minimum power, mean power, mean amplitude, peak to average power ratio, or a wide range of properties of the transmit waveform which may be used as a hard constraint. Alternatively, similar such waveform design objectives may be included as soft constraints which are combined into the network's loss function during training, as further discussed in regards to FIG. 4, below.

The MIMO channel-modeling layers 207 may also be implemented to model unknown time and rate of arrival, for example by applying a random or a priori unknown shift and scaling in the time domain, which may model scenarios in which radio propagation times vary and clocks on distributed radio systems are not synchronized. These effects may be modeled, for example, by a random time shift and a random time-dilation rate that have Gaussian distributions.

As other examples of the MIMO channel-modeling layers 207, carrier frequency and phase offset may be modeled as rotations in signal components, which may be signal basis functions. In some implementations, sampling may be performed using complex baseband representations, in which case unknown offsets in center frequency and absolute phase of arrival due to unsynchronized oscillators on transmitter and receiver, as well as Doppler shift, may result in static or linear polar mixing of the different signal components. To simulate a real system and to improve generalization, such MIMO channel-modeling layers 207 may randomly select a phase and a frequency offset, or a linear phase ramp based on an expected center frequency offset error due to independent drifting oscillators.

As yet another example of MIMO channel-modeling layers 207, delay spread in the received signals 214 may be modeled to simulate the arrival of numerous delayed and phase shifted copies of multiple signals arriving at the receiver. Since this is simulated as a linear system and we assume stability over a single sample time window, we can choose a random non-impulsive channel delay spread filter and convolve it with the received signal to obtain an output which has been spread in time linearly according to a random channel response. This assumption may be appropriate, for example, in scenarios where the signal window is smaller than the channel coherence time. In scenarios where the signal window larger than a channel coherence time, the channel progression may be modeled as a sequence with some degree of correlation, and the network 200 may learn techniques correcting the sequence of delay spread modes (e.g. due to multiple paths in the MIMO channel, or due to memory effects within hardware components).

Such delay spread and coherence time may vary in different types of communication systems, including wireline and space-based wireless systems which can sometimes have very short impulsive channel responses, or high frequency and dense multi-path wireless systems which can have long delay spreads. In some implementations, the delay spread is modeled as a MIMO channel-modeling layer 207 that implements one or more convolutions or filtering operations on the transmitted RF signals 212.

In some implementations, the network structure 200 may be utilized with one or more fixed transmission and/or receiving techniques, and may adapt the layers of the encoding network 202 and/or the decoding network 204 to learn encoding and decoding operations that are suitable for those fixed transmission/reception components. For example, in some scenarios the network structure 200 may employ fixed filtering, sampling, modulation, equalization, subcarrier assignment, reference signal insertion, encoding, or other transmission/reception techniques, and may learn suitable network layer parameters or network structures that adapt the overall communication system to best utilize those fixed components.

A general design objective for the network structure 200 may be to obtain a desired reconstruction performance for the reconstructed information 210, subject to other objectives or constraints. For example, certain realizations of the system may favor reduced power and/or bandwidth, other improved properties of the RF signals 212 to be transmitted over the channel, or improved computational complexity. As such, the system may evaluate a trade-off between these objectives, which may be used in order to help determine the specific architecture used for encoding, decoding, or other signal inference tasks.

Figure 3A:
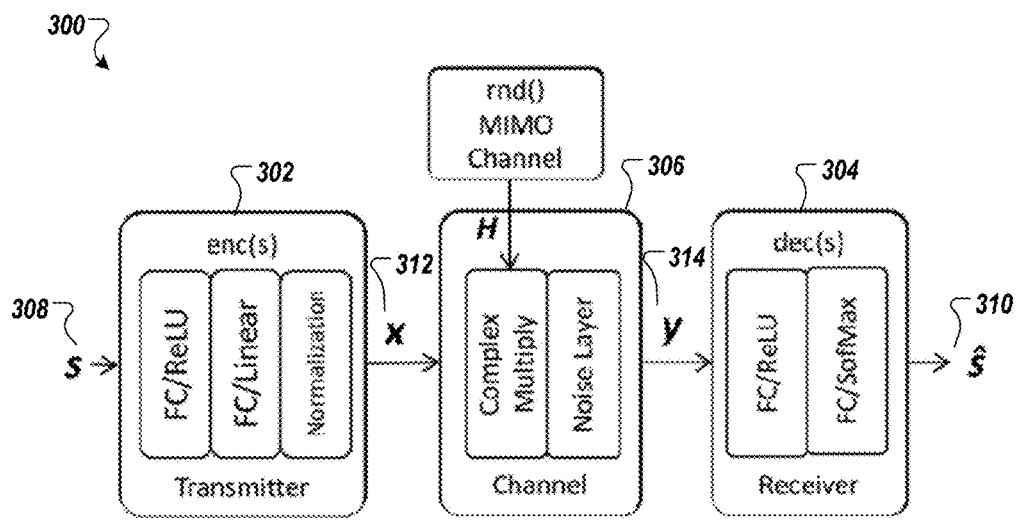
FIG. 3A illustrates an example of an open-loop network structure that may be implemented in an RF system to perform learned communication over MIMO channels using multi-antenna transceivers, without the benefit of any channel state information (CSI)

FIG. 3A illustrates an example of an open-loop network structure 300 that may be implemented in an RF system to perform learned communication over MIMO channels using multi-antenna transceivers, without the help of channel state information (CSI). In this example, the transmitter 302 implements a machine-learning encoder network and the receiver 304 implements a machine-learning decoder network that each include one or more neural network layers that may be trained to communicate over the MIMO channel 306, as was detailed with reference to FIG. 2, above. However, implementations are not limited thereto, and systems may generally implement machine-learning networks in only one of the transmitter 302 or the receiver 304.

The encoder network in the transmitter 302 includes one or more neural network layers that transform the input information 308 into multiple RF signals 312 for transmission over the MIMO channel 306, as detailed with reference to FIG. 2, above. The MIMO channel 306 includes one or more neural network layers that model the MIMO channel, and may additionally include layers that model effects of transmission and/or reception using transmitter and/or receiver components, as detailed with reference to FIG. 2, above. The receiver 304 includes one or more neural network layers that transform multiple RF signals 314 received from the MIMO channel 306 into reconstructed information 310, as detailed with reference to FIG. 2, above.

During training, the MIMO channel 306 may be modeled using either analytic, simulation, or real channel data models. For example, in FIG. 3A, the MIMO channel 306 is modeled using a randomized model that implements a layer for multiplicative effects in addition to a noise layer. In some implementations, the layers of the MIMO channel model may implement an input-output transformation according to a matrix H that is configured to generate $N_R$ outputs $\vec{y} = (y_1, \ldots, y_{N_R})$ that correspond to $N_R$ receive antennas, based on $N_T$ inputs $\vec{x} = (x_1, \ldots x_{N_T})$ that correspond to $N_T$ transmit antennas.

Figure 3B:
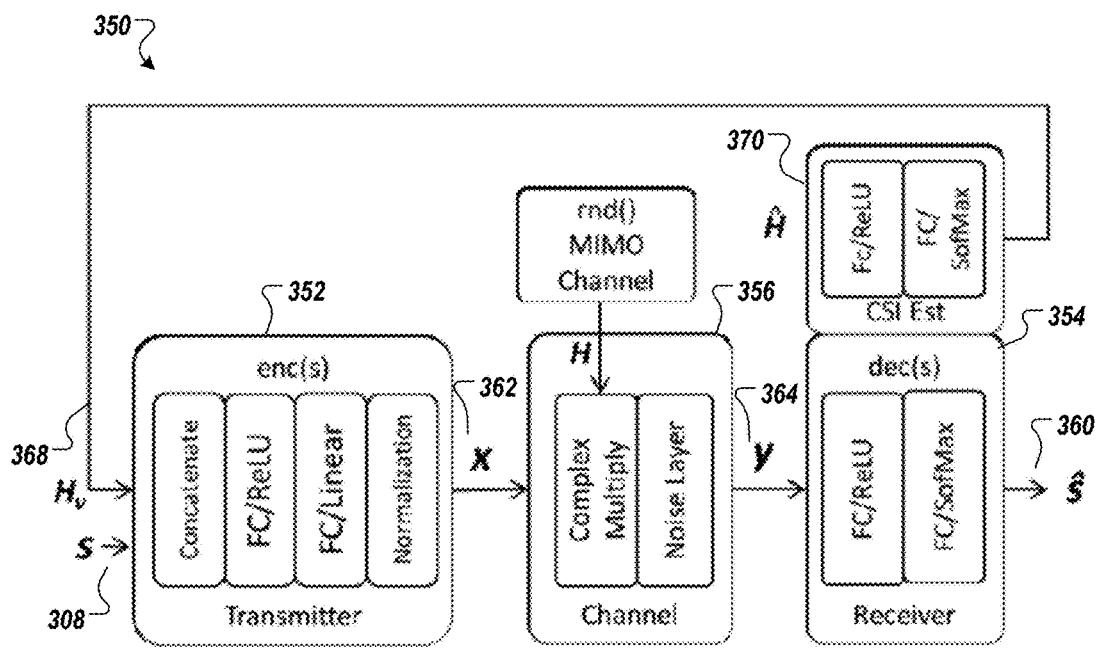
FIG. 3B illustrates an example of a closed-loop network structure that may be implemented in an RF system to perform learned communication over MIMO channels using multi-antenna transceivers, with the help of channel state information (CSI)

FIG. 3B illustrates an example of a closed-loop network structure 350 that may be implemented in an RF system to perform learned communication over MIMO channels using multi-antenna transceivers, with the benefit of channel state information (CSI). Although the example of FIG. 3B shows the CSI being generated at the receiver and fed back to the transmitter, implementations are not limited thereto, and the CSI may alternatively be generated at the transmitter, for example by utilizing a reverse channel or reverse pilot signal.

Analogous to the example that was discussed with reference to FIG. 3A, above, the example of FIG. 3B shows that a encoder network in the transmitter 352 includes one or more neural network layers that transform the input information 358 into multiple RF signals 362 for transmission over the MIMO channel 356. The receiver 354 includes one or more neural network layers that transform multiple RF signals 364 received from the MIMO channel 356 into reconstructed information 360.

However, in this example if FIG. 3B, the receiver 354 further implements a CSI estimator 370, which generates and transmits CSI 368 back to the transmitter 352. The CSI 368 may be generated based on the received RF signals 364, and may indicate various types of information regarding the MIMO channel 356, for example a state of the MIMO channel 356, or spatial information regarding multiple antennas of the system, or scheduling information regarding multiple users of the MIMO channel 356.

In this example, the decoder network at the receiver 354 generates the reconstructed information 360 without having explicit knowledge of the random channel state, but may then estimate the random channel state as CSI 368 for transmission back to the transmitter 352 (e.g., to assist in the encoding of the next packet), or may directly use the estimated CSI 368 for the transmission of information on the reverse link.

The CSI 368 may be utilized by the transmitter 352, in addition to the input information 308, to generate the input RF signals 362 for transmission over the MIMO channel 356. As such, the CSI 368 may be combined with the input information 308 into the encoding network at the transmitter 352 to obtain an improved transmit representation to effectively utilize the MIMO channel model 356 given the current random channel state. Alternatively or additionally, in some implementations, the CSI 368 may be utilized to update the MIMO channel model 356, for example, during training to achieve improved training results.

In some implementations, the CSI estimator 370 may itself implement a machine-learning network, for example as shown in FIG. 3B, including one or more neural network layers. The CSI machine-learning network in the CSI estimator 370 may be trained to learn a representation of the received RF signals 364 into a CSI 368 that indicates the random state of the channel. For example, the CSI machine-learning network may be trained to generate the CSI as a representation of channel information, which may indicate a state of the MIMO channel or spatial information, or scheduling information regarding multiple users of the MIMO channel.

In some implementations, the CSI 368 may represent a "full CSI" learned model indicating uncompressed channel information (but still typically estimated without indicating perfect knowledge of the channel state) that was learned, or may represent a "compact CSI" learned model (e.g., using partial/lossy/discretized CSI). The latter scenario may be achieved, for example, by reducing the dimension or quantizing or classifying the channel information into one of a discrete number of states or finite number of bits as the CSI, which may be referred to as "CSI embedding." In this scenario of CSI embedding, a wide range of different parametric machine-learning networks may be chosen for the CSI estimator 370 such that the CSI accurately represents the channel information in an accurate manner using minimal bits. The CSI embedding may be optimized for certain SNR levels, numbers of antennas, or multi-antenna propagation conditions. In some cases, a hyper-parameter optimization method or system may be used in order to select CSI machine-learning network in the CSI estimator 370 which best meet the engineering and performance needs of the resulting system in terms of bit error rate, information density, signal linearity, and computational complexity.

Figure 4:
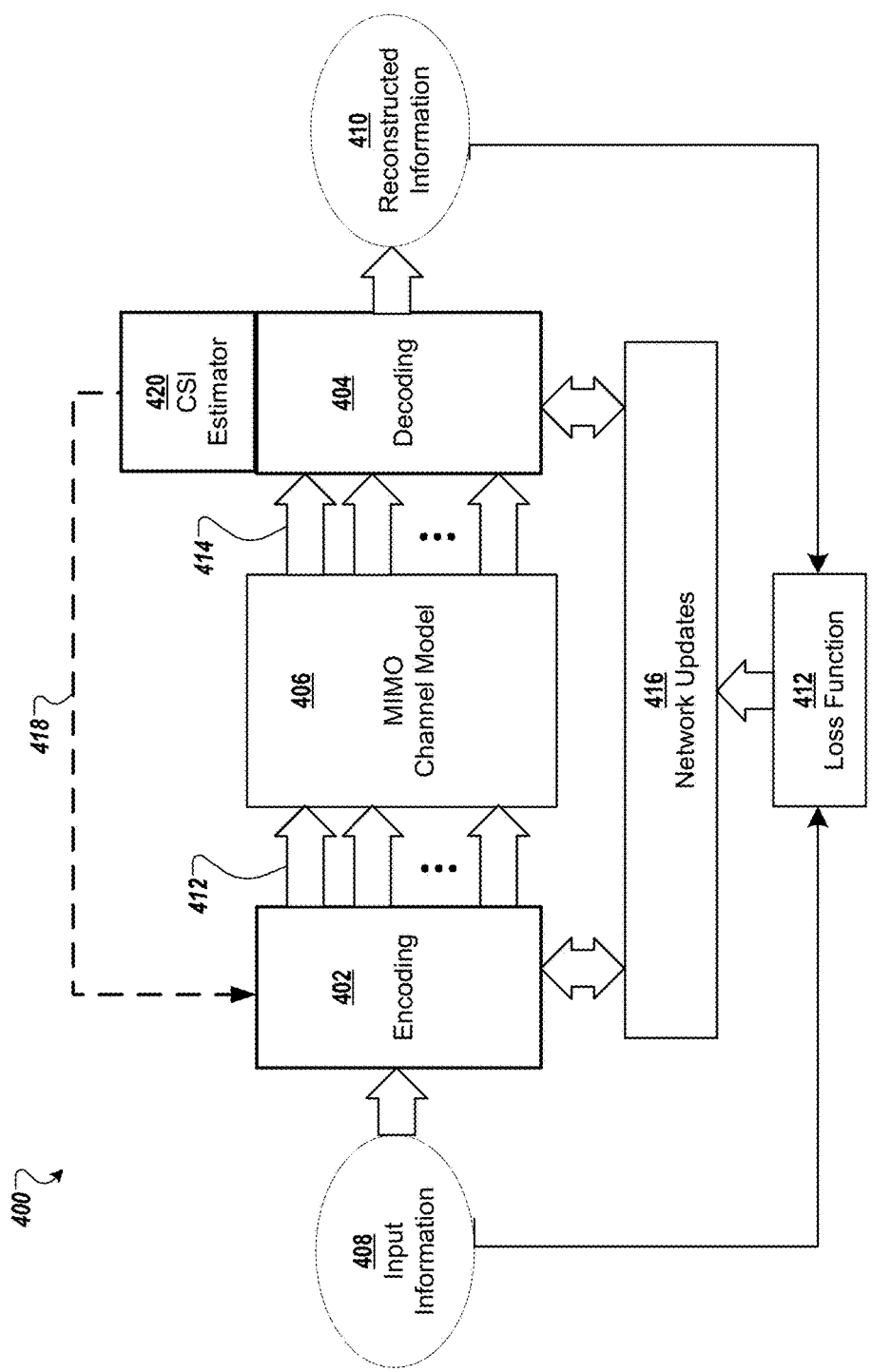
FIG. 4 illustrates an example of a training an RF system that implements at least one machine-learning network to learn to communicate over MIMO channels using multi-antenna transceivers.

FIG. 4 illustrates an example of a training an RF system 400 that implements at least one machine-learning network to learn to communicate over MIMO channels using multi-antenna transceivers. The system 400 includes a transmitter implementing an encoder network 402 and a receiver implementing a decoder network 404 that are trained to communicate over the MIMO channel 406. The training illustrated in FIG. 4 may be implemented prior to deployment, or in some scenarios may be incorporated as part of deployment, for example to further update and refine the encoder network 402 and/or the decoder network 404 based on real-world performance.

In closed-loop scenarios, the system 400 may also include CSI estimator 420, which generates CSI 418 that is additionally utilized by the encoder network 402, as was previously described with reference to FIG. 3B, above. In open-loop scenarios, however, the system 400 does not implement the CSI estimator 420. In closed-loop scenarios, the CSI estimator 420 may itself implement a machine-learning network that may be trained to generate the CSI 418. However, implementations are not limited to using machine-learning networks for all of the encoding, decoding, and CSI estimation, as some implementations may utilize machine-learning networks in only one of the encoding or decoding, or alternatively, may utilize machine-learning networks for only the CSI estimator 420, while using pre-designed components for the other functionality of system 400.

In some implementations, the encoder network 402 and decoder network 404 may be utilized for training to learn suitable encoding and decoding mappings, and such mappings may be implemented in a deployed system using more simplified encoders and decoders. For example, a deployed system may utilize using lookup tables at the encoder and distance-based metrics at the decoder, or other simplified forms of encoding and decoding, that are designed based on results of training the encoder network 402 and decoder network 404. Similarly, the CSI estimator 420 may implement a machine-learning network that is utilized for training to learn suitable CSI estimations, and such mappings may be implemented in a deployed system using more simplified CSI estimators. Further discussion of such simplified deployment scenarios is provided in regards to FIG. 7, below.

The channel 406 that is implemented during training may be a model of an RF channel that is obtained via simulation and/or based on real-world RF channel data. For example, in some implementations, training may begin with a simulated channel model and train the encoder network 402, the decoder network 404, and/or the CSI estimator 420 based on simulated propagation models reflecting a real world propagation environment or emitter data. The encoder network 302, the decoder network 304, and/or the CSI estimator 420 may then be further trained against a real channel where hardware is used with a training feedback loop.

In some implementations, the model of the channel 406 may include effects of transmitter and receiver components, such as filtering, modulation, etc. For example, in scenarios where a simulated channel is used for training, an analytic channel impairment model may be utilized that fits a specific set of hardware/software and wireless deployment conditions. As such, the training in FIG. 4 may train the encoder network 402, the decoder network 404, and/or the CSI estimator 420 to operate under different channel conditions, as well as for different real-world transmitter, receiver, and CSI estimator scenarios.

During training, the encoder network 302, the decoder network 304, and/or the CSI estimator 420 may either be jointly trained or iteratively trained. For example, the encoder network 402, the decoder network 404, and/or the CSI estimator 420 may be jointly trained as an auto-encoder (as described in regards to FIG. 2, above). In some implementations, the encoder network 402, decoder network 404, and/or the CSI estimator 420 may be separately trained.

In such scenarios, one or some of the machine-learning networks in system 400 may be fixed, either by previous training or by a pre-designed transmission/reception/CSI scheme, while the other networks are trained to learn an encoding/decoding/CSI strategy that is appropriate for the fixed counterpart networks. For example, the encoder network 402 may be fixed to generate a particular mapping of input information 408 to transmitted RF signals 412, and the CSI estimator 420 may be fixed to generate a particular mapping of received RF signals 414 to CSI 418. Meanwhile, the decoder network 404 may be trained to learn a mapping from the received RF signal 414 to reconstructed information 410 that is best suited for the fixed encoder 402 and fixed CSI estimator 420.

In some implementations, the input information 408 may be represented by training data that is utilized for training purposes. The training data may have a different form than the input information 408, but nonetheless may represent the input information 408 for purposes of training. In such scenarios, the encoder network 402 may process the training data that represents the first information, and the decoder network 404 may generate reconstructed information 410 as a reconstruction of the first information 408 represented by the training data.

The system 400 may compute a loss function 412 between the original input information 408 and the reconstructed information 410. The loss function 412 may be any suitable measure of distance between the input information 408 and reconstructed information 410, such as cross-entropy, f-divergence, mean squared error, or other geometric distance metric (e.g., MAE). In some implementations, the loss function 412 may combine several geometric, entropy based, and/or other classes of distance metrics into an aggregate expression for distance or loss.

In some implementations, additional loss terms may be used in the loss function 412 in combination with such primary loss terms, for example to accomplish secondary objectives (e.g., to reduce interference imposed upon a secondary receiver, or to improve favorable signal properties such as peak to average power ratio (PAPR), or to balance power between antennas).

In addition to achieving an objective that includes the loss function 412, the system 400 may also be configured to achieve an objective related to other performance measures, such as power, bandwidth, complexity, or other performance metrics that are relevant for communication. In some implementations, the system 400 may be configured to achieve a desired trade-off between different performance metrics. For example, achieving such a trade-off may be implemented using an objective function that combines different metrics, for example as a weighted combination of the metrics. In addition or as an alternative, this trade-off may be achieved by selecting a model according to user preferences or application specifications. In addition or as an alternative, the system 400 may implement one or more hard constraints on performance metrics, such as constraints on power, bandwidth, reconstruction error, etc.

In some implementations, a network update process 416 may update the encoder network 402, the decoder network 404, and/or the CSI estimator 420 based on the various performance metrics. This updating may include updates to the network architectures, parameters, or weights of the networks in the encoder network 402, the decoder network 404, and/or the CSI estimator 420. For example, the updating may include updating weights or parameters in one or more layers of the network(s), selecting machine-learning models for the network(s), or selecting a specific network architecture, such as choice of layers, layer-hyperparameters, or other network features. As discussed, updating may be implemented on the encoder network 402, the decoder network 404, and/or the CSI estimator 420 in a joint or iterative manner, or individually (as in the case where one or some of the networks is fixed).

As discussed above, the updates performed by network update process 416 may be performed during training to learn suitable encoding, decoding, and/or CSI estimation techniques prior to deployment, and/or may be performed during deployment (if a deployed encoder, decoder, or CSI estimator implement machine-learning networks) to further update the machine-learning networks based on real-world deployment performance results.

In some implementations, the network update process 416 may update the encoder network 402, the decoder network 304, and/or the CSI estimator 420 to achieve a desired objective function, which may include the loss function 412 and other performance metrics discussed above. In some implementations, the network update process 416 may utilize an optimization method such as one of evolution, gradient descent, stochastic gradient descent, or other solution technique.

As an example of gradient-based updates, the network update process 416 may calculate a rate of change of the objective function relative to variations in the encoder network 402, the decoder network 404, and/or the CSI estimator 420, for example by calculating or approximating a gradient of the objective function. Such variations may include, for example, variations in the weights of one or more network layers, as shown in the example of FIG. 4, or other network architecture choices. In scenarios where the channel 406 is based on real RF channel data and does not have a closed form gradient solution, an approximate method may be used to estimate the gradient of the objective function.

Based on the calculated rate of change of the objective function, the network update process 416 may determine a first variation for the encoder network 402 and/or a second variation for the decoder network 404, and/or a third variation for the CSI estimator 420. These variations may be computed, for example, using Stochastic Gradient Descent (SGD) style optimizers, such as Adam, AdaGrad, Nesterov SGD, or others. In some implementations, these variations may be computed using other scalable methods for direct search, such as evolutionary algorithms or particle swarm optimizations.

Once the variations have been determined, the network update process 416 then applies those variations to the appropriate machine-learning network. For example, the network update process 416 may update at least one encoding network weight in one or more layers of the encoder network 402, at least one decoding network weight in one or more layers of the decoder network 404, and/or at least one decoding network weight in one or more layers of the CSI estimator 420.

In general, updating the machine-learning networks of system 400 is not limited to updating network weights, and other types of updates may be implemented. For example, updating the machine-learning networks may include selecting a machine-learning model for the encoder network 402 from among a plurality of encoding models, selecting a machine-learning model for the decoder network 404, and/or selecting a machine-learning model for the CSI estimator 420 from among a plurality of CSI estimation models. In such implementations, selecting machine-learning models may include selecting a specific network architecture, such as choice of layers, layer-hyperparameters, or other network features.

The encoder network 402, the decoder network 404, and/or the CSI estimator 420 may be trained over various training models of the MIMO channel 406 and/or CSI feedback channels, which may be of the same type or of different types of MIMO channel models. Depending on the composition of the set of models for channel 406, at least one of the encoder network 402, the decoder network 404, or the CSI estimator 420 may be optimized to communicate over a certain type of MIMO channel and/or CSI feedback channel, or a wide range of different types of MIMO channels and/or CSI feedback channels.

In some implementations, the model of MIMO channel 406 may be categorized into a number of different modes. During training, the encoder network 402, the decoder network 404, and/or the CSI estimator 420 may be trained on the different modes of the MIMO channel 406. For each of these modes, the machine-learning network(s) may learn suitable encoding/decoding/CSI estimation techniques for the different channel modes. The different modes of the MIMO channel 406 may represent any suitable categorization of channel condition, such as level of noise, SNR, delay spread, rate of channel variations, bandwidth, etc. Similarly, the CSI estimator 420 may be trained on different modes of the CSI feedback channel, for example representing different levels of noise, bandwidth, etc.

In some implementations, instead of the MIMO channel 406 being a simulated channel, a real channel may be used to train the encoder network 402 and/or decoder network 304. In such implementations, additional transmission and reception components (either hardware or software) may be implemented to transmit and receive analog RF waveforms over the real channel. Such transmit and receive components may be implemented either in the encoder network 402 and decoder network 404, or their effects may be included in the channel effects that are accounted for in the model of the MIMIO channel 406. As such, the training in FIG. 4 may be performed over any suitable MIMO channel 406, whether simulated or real, to train the encoder network 402, decoder network 404 and/or the CSI estimator 420 to learn suitable encoding/decoding/CSI estimation techniques.

In some implementations, measurements may be made of wireless channel propagation information for the MIMO channel model 406 during training of a MIMO communications system using reference sounding in a real world environment. In such a system, a MIMO sounding recorder (which may be integrated within a handset or mobile device, or may be integrated within mobile embedded devices such as on a drone or vehicle) may be used to characterize the effects of the wireless channel paths between cellular towers (or other similar access points, base stations, or RF transceivers/gateways) and a mobile device such as a phone, laptop, or Internet-of Things (IoT) device, which would be in the same location as the MIMO sounding recorder. In this case, the cellular towers may use a reference signal generation process such as the transmission of a known P/N sequence, a preamble or other reference signal, radio transmit hardware such as mixers, digital to analog converters, filters, amplifiers, etc., and a set of transmit antennas. These signals emanate over a set of wireless channel paths in the real-world MIMO channel between transmitter antennas and receiver antennas at the sounding recorder. A radio tuning and analog-to-digital converter (ADC) receives and digitizes the transmitted signal at the MIMO sounding recorder. In some implementations, an optional synchronization algorithm is used to locate and perform estimation or synchronization tasks on the reference signal.

Subsequently, a radio channel response, derived information or raw receive signal is stored on the device to maintain a record of the conditions present on the wireless channel paths at the time of measurement. Location information reception and storage may also be performed in some implementations on the MIMO sounding recorder to correlate this information with spatial information about the MIMO channel environment, which can be used later during training or deployment of MIMO communications systems. This stored information may contribute to a large experiential data set of real measured channel propagation conditions which may be used to generate MIMO channel models 406 from recorded sounding data during the training of new radio communications systems.

During training, the encoder network 402 may be configured to learn a mapping from input information 408 into multiple transmitted RF signals 412. Analogously, the decoder network 404 may be configured to learn a reverse mapping from multiple received RF signals 414 into reconstructed information 410. As discussed above, the transmitted RF signals 412 and received RF signals 414 may represent analog RF waveforms that are transmitted and received over a the MIMO channel, or may represent intermediate representations (e.g., samples of RF waveforms, coefficients of basis functions, distributions over RF waveforms, etc.) that are transformed to and from analog RF waveforms through processing by one or more other components, such as filters, modulators, equalizers, etc. For example, in the scenario where the encoder network 402 and decoder network 404 are implemented as a variational auto-encoder (as discussed in regards to FIG. 2, above), the RF signals 412 and 414 may represent distributions over RF waveform values. In general, the transmitted RF signals 412 and received RF signals 414 may represent any suitable RF signal representations that are learned by the encoder network 402 and decoder network 404 for encoding and decoding information over a particular channel or class of channels.

In some implementations, the encoding and decoding mappings may involve a set of basis functions. The basis functions may be used by the encoder network 402 to transform the input information 408 into the transmitted RF signals 412, each of which may be a set of basis coefficients, or an RF waveform that is a weighted combination of basis functions, or other suitable representation using a particular set of basis functions. Analogously, the decoder network 404 may use the same set of basis functions to process the received RF signals 414 to generate the reconstructed information 410, for example by taking projections of each of the RF signals 414 onto the set of basis functions to generate basis coefficients, or in the scenario where each of the RF signals 414 is itself a set of basis coefficients, by transforming the basis coefficients in each of the RF signals 414 into the reconstructed information 410.

The basis functions may be any suitable set of orthogonal or non-orthogonal set of basis functions. For example, the basis functions may be In-Phase and Quadrature-Phase (I/Q) signals, Fourier basis functions, polynomial basis functions, Gaussian basis functions, exponential basis functions, wavelet basis functions, or combinations of these and/or other suitable set of basis functions that can be utilized represent RF waveforms that are transmitted over a channel. The basis functions may have different phase, amplitude, and/or frequency components. In some implementations, the basis functions may be parameterized and the training may involve optimizing over parameters of the basis functions.

Training the encoder network 402 and decoder network 404 may begin with any suitable set of initial conditions. For example, the training may begin with a random set of basis functions subject to certain conditions. Alternatively, the training may begin with a fixed set of basis functions, such as commonly used RF communication basis functions including Quadrature Phase-Shift Keying (QPSK) or Gaussian Binary Frequency Shift Keying (GFSK), orthogonal frequency division multiple access (OFDM), a previously trained set of machine learning networks, or other fixed set of basis functions.

During training, the encoder network 402 and decoder network 404 attempt to learn improved basis functions, according to results of encoding and decoding. Training the encoder 402 and decoder 404 may involve optimizing over a set of basis functions or over different sets of basis functions, for example using greedy search or other optimization-type algorithm.

In some implementations, the input information 408 may be chosen from a training set of information. The input information 408 may, in some implementations, be limited to a particular class of information, such as binary information, discrete-time information, analog waveforms, or other class of information. In such scenarios, the system 400 will be trained to learn communication encoding and decoding techniques that are tuned to communicate that particular class of information (over a particular channel or class of channels). By training on different types of information 408 and different types of MIMO channels 406, the system 400 may be trained to learn different encoding and decoding operations that are applicable to different communication scenarios.

The loss function 412 may be any suitable measure, or combination of measures, of distance between the input information 408 and the reconstructed information 410. For example, the loss function 412 may include cross-entropy, f-divergence, mean squared error (MSE), clipped MSE which penalizes predicted values according to MSE but only for values which fall on the wrong side of a decision threshold, or an exponential loss function that penalizes loss exponentially, or other suitable distance metric(s).

In addition, as discussed above, other performance metrics may be incorporated into training, for example as part of the loss function 412 and/or as hard constraints, etc. For example, such performance metrics may include codeword error rate (CER), bit error rate (BER) as a function of the signal-to-noise ratio (SNR), communication bandwidth, communication power, spectral efficiency (the number of bits per second that can be transmitted over a fixed bandwidth channel at a specific SNR). Any one or combinations of such metrics may be utilized during training as part of the loss function 412 (e.g., as a weighted combination) and/or as hard constraints in addition to the loss function 412.

Figure 5:
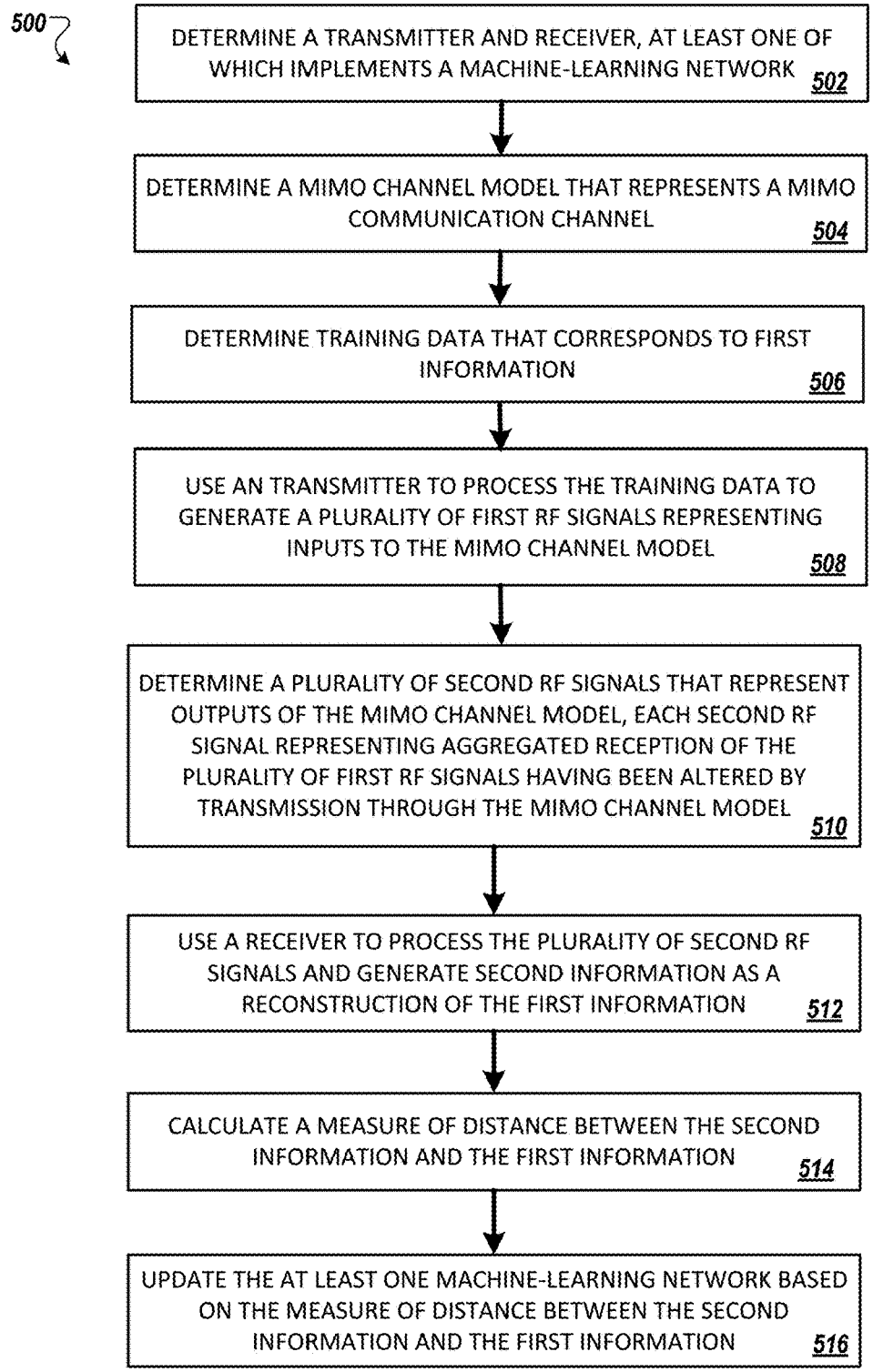
FIG. 5 is a flowchart illustrating an example method of training an RF system that implements at least one machine-learning network to learn to communicate over MIMO channels with feedback of CSI using multi-antenna transceivers.

FIG. 5 is a flowchart illustrating an example method 500 of training an RF system that implements at least one machine-learning network to learn to communicate over MIMO channels with feedback of CSI using multi-antenna transceivers. The training method 400 may be performed by one or more processors, such as one or more CPUs, GPUs, DSPs, FPGAs, ASICs, TPUs, or neuromorphic chips or vector accelerators that execute instructions encoded on a computer storage medium.

The training method 500 includes determining a transmitter and a receiver, at least one of which is configured to implement at least one machine-learning network (502). As discussed above, the at least one machine-learning network may be an encoding machine-learning network, a decoding machine-learning network, and/or a CSI estimation machine-learning network.

The method 500 further includes determining a MIMO channel model that represents transmission effects of a MIMO communication channel (504). As discussed above, the MIMO channel model may be implemented using either analytical models, simulation models, or real-world propagation data.

The method 500 further includes determining first information for transmission over the MIMO channel model (506). As discussed above, the first information may be any suitable discrete-time, analog, discrete-valued, or continuous-valued information. For example, in some instances, this input information may be whitened discrete bits or symbols, or in other cases, the input information may follow the distribution of a non-whitened information source. As previously discussed in regards to FIG. 4, above, in some implementations, the first information may be represented by training data that is utilized for training purposes. In such scenarios, the training data may have a different form than the first information, but nonetheless may represent the first information for purposes of training.

The method 500 further includes using the transmitter to process the first information and generate a plurality of first RF signals representing inputs to a MIMO channel model (508). As discussed above, in some implementations the first information may be represented by training data, in which case the transmitter processes the training data representing the first information. Furthermore, as discussed above, the generated first RF signal may represent an analog RF waveform that is transmitted over a channel, or may be an intermediate representation (e.g., samples, basis coefficients, distributions over RF waveforms, etc.) that undergoes further processing (e.g., filtering, D/A conversion, modulation, etc.) to generate an analog RF waveform. This encoding process may utilize any suitable mapping from an input information space into an RF signal space, as discussed in regards to FIG. 4, above. In closed-loop scenarios, processing the first information may also include processing CSI that is generated by a CSI estimator, as discussed with reference to FIG. 3B, above.

The method 500 further includes determining a plurality of second RF signals representing outputs of the MIMO channel model, each second RF signal of the plurality of second RF signals representing aggregated reception of the plurality of first RF signals having been altered by transmission through the MIMO channel model (510). In training scenarios, the effects of the communication channel may be implemented by a model of a channel obtained by simulation and/or real channel data, or may be implemented by a real-world communication channel. As discussed above, each of the second RF signals may represent an analog RF waveform that is received over a channel, or may be an intermediate representation (e.g., samples, basis coefficients, distributions over RF waveforms etc.) that is a result of processing (e.g., filtering, sampling, equalizing, etc.) a received analog RF waveform.

The method 500 further includes using the receiver to process the plurality of second RF signals and generate second information as a reconstruction of the first information (512). As previously discussed in regards to FIG. 4 above, in some implementations, the first information may have been represented by training data that is utilized for training purposes. In such scenarios, the input training data may have a different form than the original first information, but nonetheless the receiver may generate the second information as a reconstruction of the first information that is represented by the training data. This decoding process may utilize any suitable mapping from an RF signal space into reconstructed information space, as discussed in regards to FIG. 4, above.

The method 500 further includes calculating a measure of distance between the second information and the first information (514). This measure of distance may be implemented as a loss function (e.g., loss function 318 in FIG. 4) and may represent a difference or error between the original input information and the second (reconstructed) information. As examples, the measure of distance may include cross-entropy, mean squared error, or other geometric distance metric (e.g., MSE, MAE, KL divergence, f-divergence), or may combine several geometric and/or entropy-based distance metrics into an aggregate expression for distance.

The method 500 further includes updating the at least one machine-learning network based on the measure of distance between the second information and the first information (514). This update may be applied to machine-learning networks in the transmitter and/or the receiver in a joint or iterative manner, or individually, as discussed above. In closed-loop scenarios, the update may be applied to a CSI estimator in the receiver. The updates may generally include updating any suitable machine-learning network feature of the transmitter and/or receiver, such as network weights, architecture choice, machine-learning model, or other parameter or connectivity design, as discussed in regards to FIG. 4, above. As an example, in some implementations, if the transmitter and/or receiver are trained to learn a set of basis functions for communicating over the MIMO channel, then the update process may include updating the set of basis functions that are utilized in the transmitter and/or receiver.

Figure 6A:
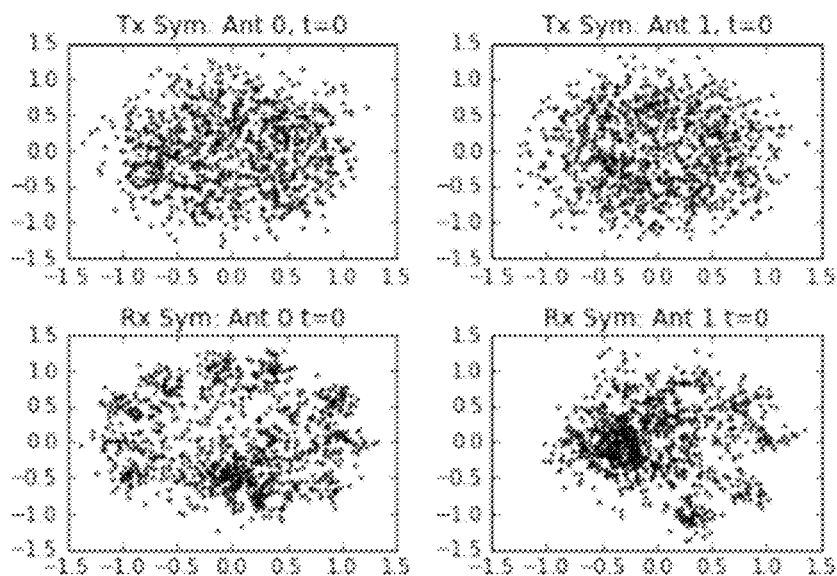
FIGS. 6A and 6B illustrate examples of different types of transmit and receive RF signals that may be learned by machine-learning networks for communication over a MIMO channel without the help of any CSI (the open-loop scenario)
Figure 6B:
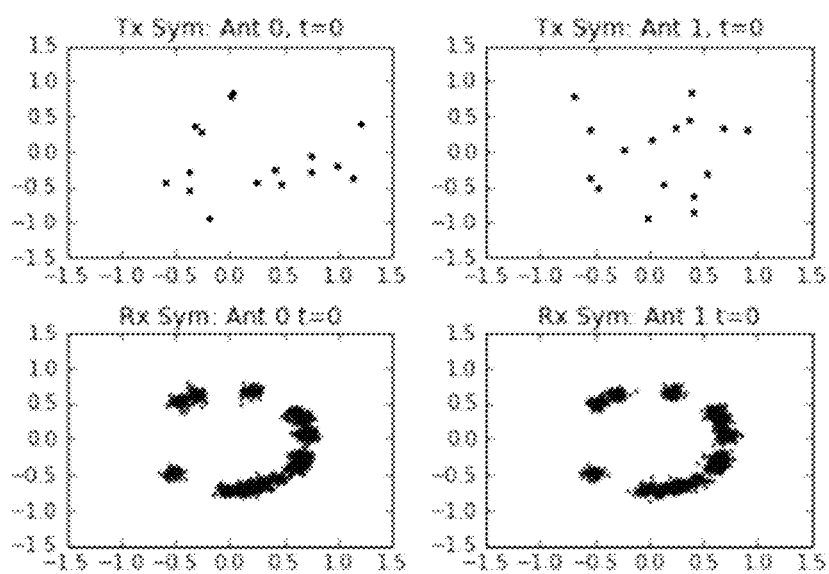

FIGS. 6A and 6B illustrate examples of different types of transmit and receive RF signals that may be learned by machine-learning networks for communication over a MIMO channel without the help of CSI (i.e., the open-loop scenario). The signals may correspond to the previously discussed transmitted RF signals 412 and received RF signals 414 in FIG. 4, above.

In particular, FIGS. 6A and 6B illustrate open-loop transmit constellations (the upper two figures in each of FIGS. 6A and 6B) and open-loop receive constellations (the lower two figures in each of FIGS. 6A and 6B) for a two-input and two-output (2×2) MIMO channel. FIG. 6A shows transmit and receive constellations over a number of random channel samples for the MIMO channel in which all the entries of the channel transition matrix H are selected at random, while FIG. 6B shows the constellations for an all-ones H matrix. As shown, for an H matrix with roughly uniform power for each channel, the machine-learning decoder network learns a receive waveform which has nearly constant amplitude phase encoding, while the encoder network learns transmit constellations that appear to be quite random arrangements of $2^k=16$ bits, forming a non-standard 16-QAM type arrangement.

Therefore, based on such training, the encoder and/or decoder may be deployed to utilize different sets of transmit and receive constellations for different channel conditions (e.g., different channel transition matrices H) in an adaptive manner. For example, in scenarios where machine-learning networks are deployed in a real-world communication system, the system may obtain channel state information (CSI) and adjust the encoder network and/or decoder network according to the state of the channel. Depending on the state of the channel, the encoder network and/or decoder network may simply adjust parameters (e.g., transmission power) for the same set of constellations, or may change the set of constellations entirely (e.g., by switching between the constellations in FIGS. 6A and 6B). Such updates may also be performed during deployment based on simplified encoders and/or decoders that do not utilize full machine-learning networks, but instead utilize simplified encoding and/or decoding techniques based on results of training a corresponding encoder machine-learning network and decoder machine-learning network.

Figure 6C:
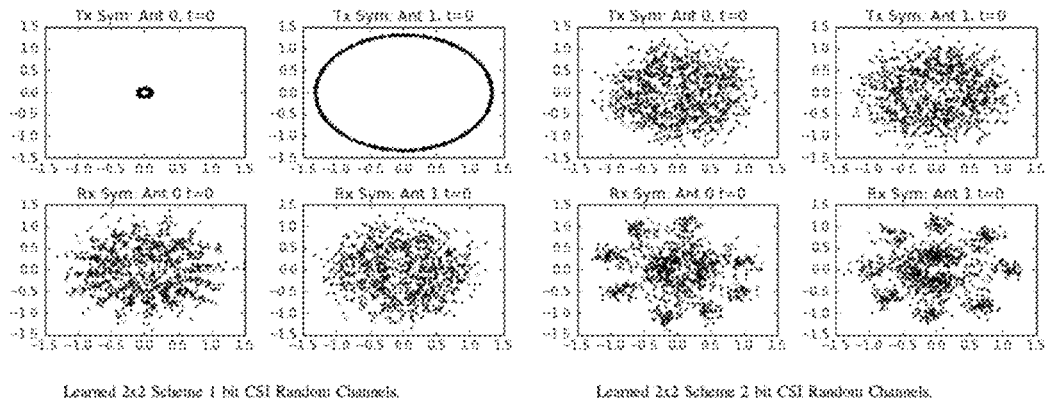
FIGS. 6C and 6D illustrate examples of different types of transmit and receive RF signals that may be learned by machine-learning networks for communication over a MIMO channel with the benefit of CSI (the closed-loop scenario)
Figure 6D:
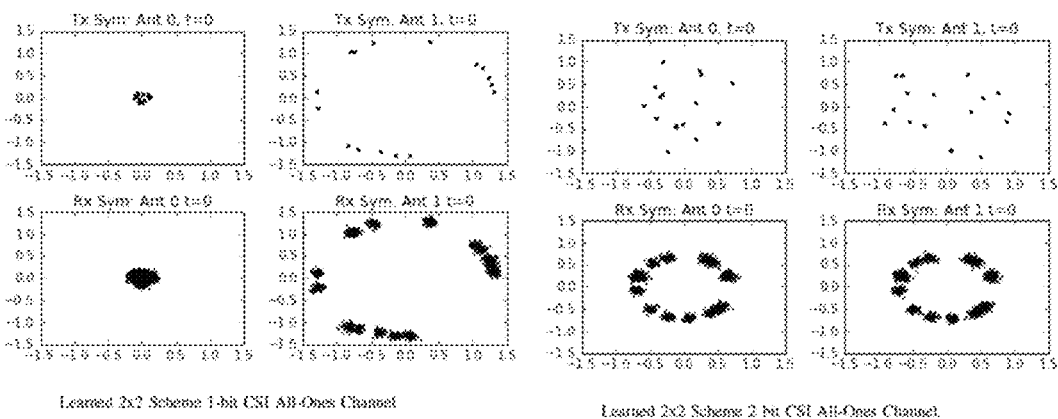

FIGS. 6C and 6D illustrate examples of different types of transmit and receive RF signals that may be learned by machine-learning networks for communication over a MIMO channel with the benefit of CSI (i.e., the closed-loop scenario). The signals may correspond to the previously discussed transmitted RF signals 412 and received RF signals 414 in FIG. 4, above.

In particular, FIGS. 6C and 6D illustrate closed-loop transmit constellation (the upper row of four figures in each of FIGS. 6C and 6D) and closed-loop receive constellations (the lower row of four figures in each of FIGS. 6C and 6D) for a two-input and two-output (2×2) MIMO channel with 1-bit CSI and 2-bit CSI. FIG. 6C shows transmit and receive constellations over a number of random channel samples for the MIMO channel in which all the entries of the channel transition matrix H are selected at random, while FIG. 6D shows the constellations for an all-ones H matrix.

For the 1-bit CSI scenario shown in FIGS. 6C and 6D, we see that the transmitter and receiver learn a multi-level constellation scheme, where the first antenna and the second antenna transmit constant modulus encodings at two distinct power levels. For the 2-bit CSI scenario shown in FIGS. 6C and 6D, we can see that the transmitter learns a complex multi-level transmission scheme, similar to an irregular 16-QAM on each transmitter, and that the receiver learns, for roughly equal power paths, approximately constant modulus constellations.

Figure 7:
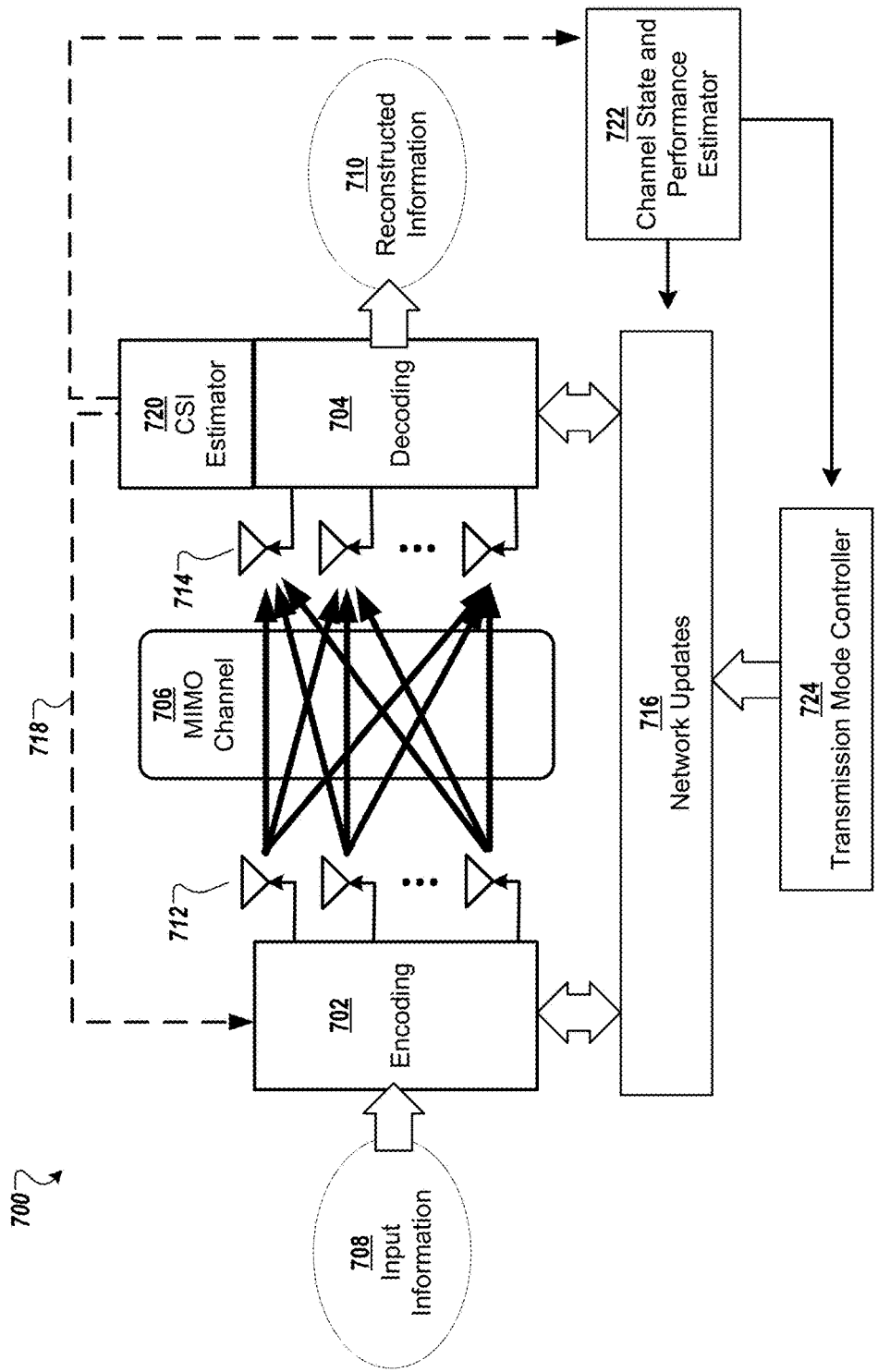
FIG. 7 illustrates an example of deploying a system that implements techniques that have been learned based on results of training at least one machine-learning network to perform learned communication over a real-world MIMO channel using multi-antenna transceivers.

FIG. 7 illustrates an example of a system 700 with a transmitter and receiver that may be deployed for learned communication of information over a real-world MIMO communication channel. The system 700 includes a transmitter 702 and receiver 704 that are deployed to communicate over a real-world MIMO channel 706.

The transmitter 702 receives input information 708 to be communicated, and maps the input information 708 into multiple RF signals 712 for transmission over multiple transmit antennas. The encoding mapping that is utilized by the transmitter 702 may be designed based on previous training of a machine-learning network that learned how to encode information into RF signals, using the training described in regards to FIGS. 2 to 4, above. For example, the transmitter 702 may implement a trained machine-learning network during deployment, or may implement a simplified encoding mapping that utilizes results of training a machine-learning network, as discussed further below.

As previously discussed, in some implementations, the transmitter 702 may include processing (e.g., filtering, modulation, mixing, amplification, A/D conversion, etc.) that generates the RF signals 712 as analog RF waveforms for transmission. Alternatively, in other implementations, the transmitter 702 may generate the RF signals 712 as intermediate representations that are subsequently processed into analog RF waveforms by additional processing such as filtering or modulation for transmission over the MIMO channel 706.

The receiver 704 receives multiple RF signals 714 over multiple receive antennas over the MIMO channel 706, and maps the multiple received RF signals 714 into reconstructed information 710. The decoding mapping that is utilized by receiver 704 may be designed based on previous training of a machine-learning network that learned how to decode RF signals into reconstructed information, using the training described in regards to FIGS. 2 to 4, above. For example, the receiver 704 may implement a trained machine-learning network during deployment, or may implement a simplified decoding mapping that utilizes results of training a machine-learning network, as discussed further below. In a closed-loop system, the receiver 704 may also implement a CSI estimator 720 that generates CSI 718 based on the received RF signals 714, as discussed with reference to FIG. 3B, above.

As previously discussed, in some implementations, the receiver 704 may include processing (e.g., filtering, modulation, amplification, mixing, A/D conversion, etc.) that directly inputs the multiple received RF signals 714 as analog RF waveforms received over the channel. Alternatively, in other implementations, the receiver 704 may process the RF signals 714 as intermediate representations that result from prior processing of multiple analog RF waveforms that were received from the MIMO channel 706.

In some implementations, the transmitter 702 and/or receiver 704 (including the CSI estimator 720 in closed-loop scenarios) may be updated during deployment, for example by update process 716, based on results of communication. Such updates may be based on feedback information that is determined based on results of transmission and reconstructions during deployment.

In some implementations, the system 700 may be configured to collect information regarding the MIMO channel 706 and/or regarding performance metrics, for example using channel state and performance estimator 722. The channel state and performance estimator 722 may be configured to detect such information, for example, by detecting a training signal that was transmitted as the transmitted RF signals 714 and/or based on the CSI generated by the CSI estimator 720 (which may be implemented as part of the channel state and performance estimator 722 in some implementations) The channel state and performance estimator 722 may provide such information via feedback to control various updates to the transmitter 702 and/or receiver 704 during deployment, as shown in the example of FIG. 7. Such updates may include updating one or more machine-learning features (in scenarios where the transmitter 702 and/or receiver 704 implement machine-learning networks during deployment), or may include updating a simplified encoding/decoding/CSI estimator mappings that utilized by the transmitter 702 and/or receiver 704 (in scenarios where the transmitter 702 and/or receiver 704 implement simplified encoding/decoding/CSI estimation techniques based on previously-trained machine-learning networks).

The feedback that is sent from the CSI estimator 720 and/or the channel state and performance estimator 722 may take any suitable form and may be transmitted on any suitable time scale. For example, such feedback may be provided based on estimates obtained from the forward link (transmitter 702 to receiver 704) or based obtained from a reverse link (receiver 704 to transmitter 702) to estimate the state of the channel and/or estimates of performance. The feedback information may vary in size depending on various factors, such as the number of modes to choose from, the available bandwidth and latency of the feedback channel, and other considerations. In some instances, this feedback information may be encoded into protocol messages within a wireless system.

As an example, the feedback may be generated by the transmitter 702 transmitting a known training RF signal, and the receiver 704 (and/or other component in the RF receiver) determining the state of the channel and performance measurements based on comparing the received RF signal with the known transmitted training RF signal. In some implementations, the feedback may only be provided to the receiver to update the receiver 704, without necessarily providing the feedback to the transmitter to update the transmitter 702 (half-model updates).

The conditions of MIMO channel 706 may change over different time scales, for example depending on the type of environment in which the RF signals are communicated. For instance, the time scale of variations in the MIMO channel 706 may depend on whether the environment is rural or urban, whether environmental objects are moving quickly or slowly (e.g., specifying coherence time, or correlation time of channel statistics), whether the environment is in an aircraft or spacecraft, or may depend on user density, band allocations, or whether other radio emitters are located nearby. In some instances where the channel coherence time is very long or static (e.g., fixed radios and reflectors), encodings may be specifically learned for these impairments over long time scale. One example of this might be in a fixed geometry industrial or urban communications environment.

In some implementations, the conditions present in the MIMO channel 706 may be categorized into a number of different modes. The different modes may represent any suitable categorization of channel conditions, such as level of noise, SNR, delay spread, time scale of channel variations, etc. For each of these modes, machine-learning networks in the transmitter 702 and/or receiver 704 may have been trained to learn a suitable set of encoding/decoding/CSI estimation techniques, as discussed in regards to FIG. 4, above. During deployment, the transmitter 702 and/or receiver 704 may be adaptively updated based on the particular mode of the MIMO channel 706 that is estimated. As shown in FIG. 7, in some implementations, a transmission mode controller 724 may be implemented to decide which mode configuration is to be utilized for the transmitter 702 and/or receiver 704.

The transmission mode controller 724 may utilize feedback from the channel state and performance estimation 722. As discussed above, such feedback may be obtained from the forward and/or reverse link, and may be provided to the transmission mode controller 722 to help decide which mode of operation to select at any given time. In this way, the system 700 can learn suitable encoding and/or decoding techniques for a range of different channel conditions and then adaptively update the transmitter 702 and/or receiver 704 to select a suitable mode under any given channel condition.

There are a number of scenarios in which learned communications may be used in real world applications. For example, during training, the transmitter 702 and/or receiver 704 may be trained on closed-form analytic models of the MIMO channel 706. Given sufficiently accurate stable analytic models of the channel of interest, efficient representations for communication across the MIMO channel 706 may be learned and used without any on-line adaptation. Such implementations may be suitable in environments where the real-world MIMO channel 706 sufficiently corresponds to analytic models, such as channels that vary slowly in time, or are otherwise more stable and predictable.

As another example, in scenarios where channels vary more unpredictably in the real world, such as depending on deployment location, conditions, or nearby effects, the system 700 may perform on-line adaptation and on-line learning of specialized encoding and/or decoding techniques that perform well for the given real world deployment scenario. In such implementations, updates to the transmitter 702 and/or receiver 704 may be performed during deployment, based on real-world measurements of the channel and/or system performance. Such updates may be performed based on results of objective-achieving strategies that were learned in regards to training in FIGS. 2 to 4, above.

However, if the real-world feedback does not lend itself to exact analytic expression for the channel transform, then the update process 716 may utilize approximations, rather than exact analytic solutions, to determine updates for the transmitter 702 and/or receiver 704. For example, in implementations where gradients of an objective function are computed, then approximate gradients may be computed, rather than exact derivative calculations. Furthermore, in real-world scenarios, the update process 716 may additionally consider real-world factors, such as communications cost, latency, and capacity of the feedback channel from the channel state and performance estimator 722. In general, more accurate and more extensive feedback allows for updates that are more effective by the update process 716, but at the cost of communications, latency, and bandwidth. Therefore, in deployment scenarios where the transmitter 702 and/or receiver 704 are updated based on feedback information, such additional considerations may be factored into the update process 716.

In some implementations, the transmitter 702 and/or receiver 704 may utilized simplified forms of encoding/decoding/CSI estimation mappings that were learned during training. For example, the transmitter 702 may utilize a simplified lookup table to generate the transmitted RF signals 712 based on the input information 708. Analogously, in some implementations, the receiver 704 may generate the reconstructed information 710 and/or CSI 718 from the received RF signals 714 by utilizing a distance-based decoding technique, or other simplified decoding technique that is based on a more general decoding mapping learned during training, or that is based on an encoder mapping that was learned during training.

As a specific example of such simplified deployment, in some implementations, during training, an encoder machine-learning network may learn a mapping from input information 708 to RF signals 712. The mapping may be, for example, a signal constellation that represents different RF signals 712 as different points in the constellation corresponding to particular input information 708. However, during deployment, the transmitter 702 may utilize a simplified lookup-table (LUT) to map input information 708 to points on the constellation to generate the RF signals 712, based on the training results of the encoder machine-learning network. Analogously, the receiver 704 may utilize simplified decoding algorithms (e.g., distance-based decoding algorithms) that are based on results of training a decoder machine-learning network, or based on a counterpart trained encoder machine-learning network.

In such scenarios, the transmitter 702 and/or receiver 704 may be trained (e.g., as an autoencoder) for system design during training, but approximations or compact look up tables may be utilized, in the transmitter 702 and/or the receiver 704, to deploy and implement the system 700 in real-world applications. As such, in some implementations, the transmitter 702 and receiver 704 that are implemented in a deployed system may not implement a full machine-learning network, but instead may utilize results of encoding/decoding/CSI estimation mappings that were learned by machine-learning networks during training. In some cases, these learned mappings from a neural network may already form very compact and efficient tensor computation expressions which can be deployed efficiently into a baseband processor.

Figure 8:
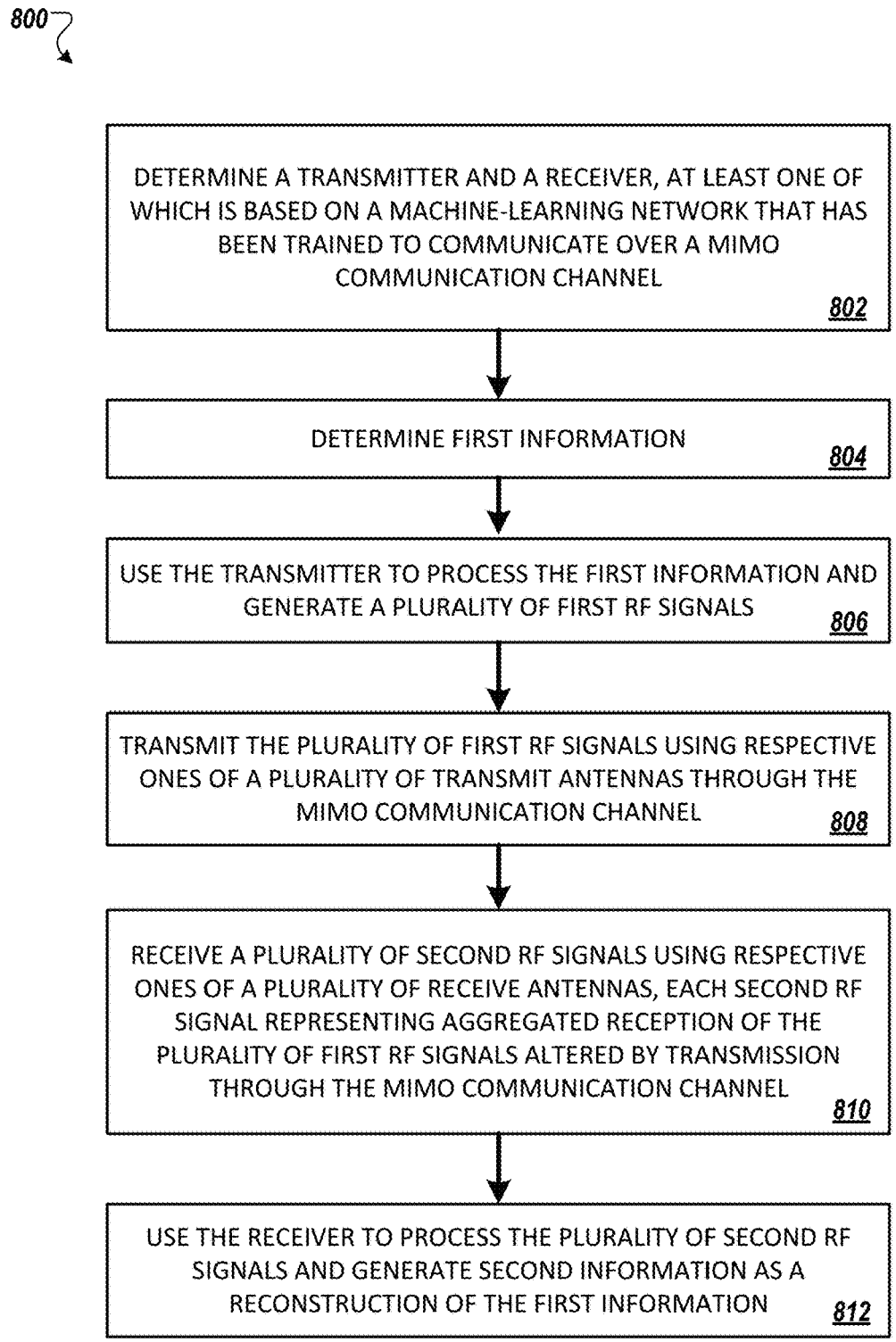
FIG. 8 is a flowchart illustrating an example method of deploying a system that utilizes techniques that have been learned based on results of training at least one machine-learning network to perform learned communication over a real-world MIMO channel using multi-antenna transceivers.

FIG. 8 is a flowchart illustrating an example method 800 of deploying a system that utilizes techniques that have been learned based on results of training at least one machine-learning network to perform learned communication over a real-world RF channel using multi-antenna transceivers. Such deployment may utilize encoding, decoding, and/or CSI estimations techniques that were previously learned by machine-networks during trained, for example by using training techniques discussed in regards to FIGS. 2 to 4, above, or similar training techniques.

The method 800 includes determining a transmitter and a receiver, at least one of which is configured to implement at least one machine-learning network that has been trained to communicate over a MIMO communication channel (802). In some scenarios, the deployed transmitter and/or receiver may implement machine-learning networks that were previously trained. Alternatively, in other scenarios, the transmitter and/or receiver may utilize simplified encoding/decoding mappings that are based on results of previously training an encoder machine-learning network and/or decoder machine-learning network and/or CSI machine-learning network, as discussed in regards to FIG. 7, above.

The method 800 further includes determining first information for transmission over the MIMO communication channel (804). As discussed above, the first information may be any suitable discrete-time, analog, discrete-valued, or continuous-valued information.

The method 800 further includes using the transmitter to process the first information and generate a plurality of first RF signals (806). As discussed above, the first RF signals may represent analog RF waveforms that are transmitted over the MIMO channel, or may be intermediate representations (e.g., samples, basis coefficients, etc.) that undergo further processing (e.g., filtering, D/A conversion, amplification, modulation, etc.) to generate analog RF waveforms. This encoding process may utilize any suitable mapping, or simplified form of a mapping, from an input information space into an RF signal space that was learned during training an encoder machine-learning network, for example using training techniques discussed in regards to FIG. 4, above. In closed-loop scenarios, the transmitter may process the first information by also processing CSI, which may have been generated by the transmitter itself or received via feedback from the receiver, as discussed in regards to FIG. 3B, above.

The method 800 further includes transmitting the plurality of first RF signals using respective ones of a plurality of transmit antennas through the MIMO communication channel (808). As discussed in regards to step 806, above, transmission of the first RF signals may involve directly transmitting the first RF signals themselves (e.g., if the transmitter has generated the first RF signals as analog RF waveforms suitable for transmission over the channel), or may involve processing the first RF signals to convert them into respective analog RF waveforms for transmission (e.g., using filtering, D/A conversion, modulation, etc.). The transmission may utilize any suitable transmission technique which may include other features or parameters, for example using multiple antennas, adaptive power control, etc.

The method 800 further includes receiving a plurality of second RF signals using respective ones of a plurality of receive antennas, each second RF signal of the plurality of second RF signals representing aggregated reception of the plurality of first RF signals having been altered by transmission through the MIMO communication channel (810). In deployment scenarios, the communication is a real-world MIMO channel (in contrast to training scenarios of FIG. 4, where the channel may be a simulated channel or real-world channel). As discussed above, the second RF signals may represent analog RF waveforms that are received over the MIMO channel, or may be intermediate representations (e.g., samples, basis coefficients, etc.) that are results of processing (e.g., filtering, sampling, equalizing, etc.) received analog RF waveforms.

The method 800 further includes using the receiver to process the plurality of second RF signals and generate second information as a reconstruction of the first information (812). This decoding process may utilize any suitable mapping, or simplified form of a mapping, from multiple RF signal spaces into reconstructed information space that was learned by a decoder machine-learning network during training, for example using training techniques discussed in regards to FIG. 4, above. In closed-loop scenarios, the receiver may also implement a CSI estimator to generate CSI that is fed back to the transmitter.

As discussed in regards to FIG. 7, above, in some implementations, a deployed system may utilize the received second RF signals (and/or other information resulting from the communication) to generate feedback and update the transmitter and/or the receiver based on real-world channel information and/or performance results.

Furthermore as discussed in regards to FIG. 7, above, in some implementations, the transmitter and/or receiver may utilized simplified forms of encoding/decoding/CSI estimations mappings that were learned during training. For example, the transmitter may utilize a simplified lookup table to generate the first RF signal based on the first information. Furthermore, in some implementations, the receiver may utilize a distance-based decoding technique, or other simplified decoding technique that is based on a more general decoding mapping that was learned during training, or that is based on the encoder mapping that was learned during training. As such, in some implementations, the transmitter and receiver that are implemented in a deployed system may not implement a full machine-learning network, but instead may utilize results of encoding/decoding/CSI estimations mappings that were learned by machine-learning networks during training.

Figure 9A:
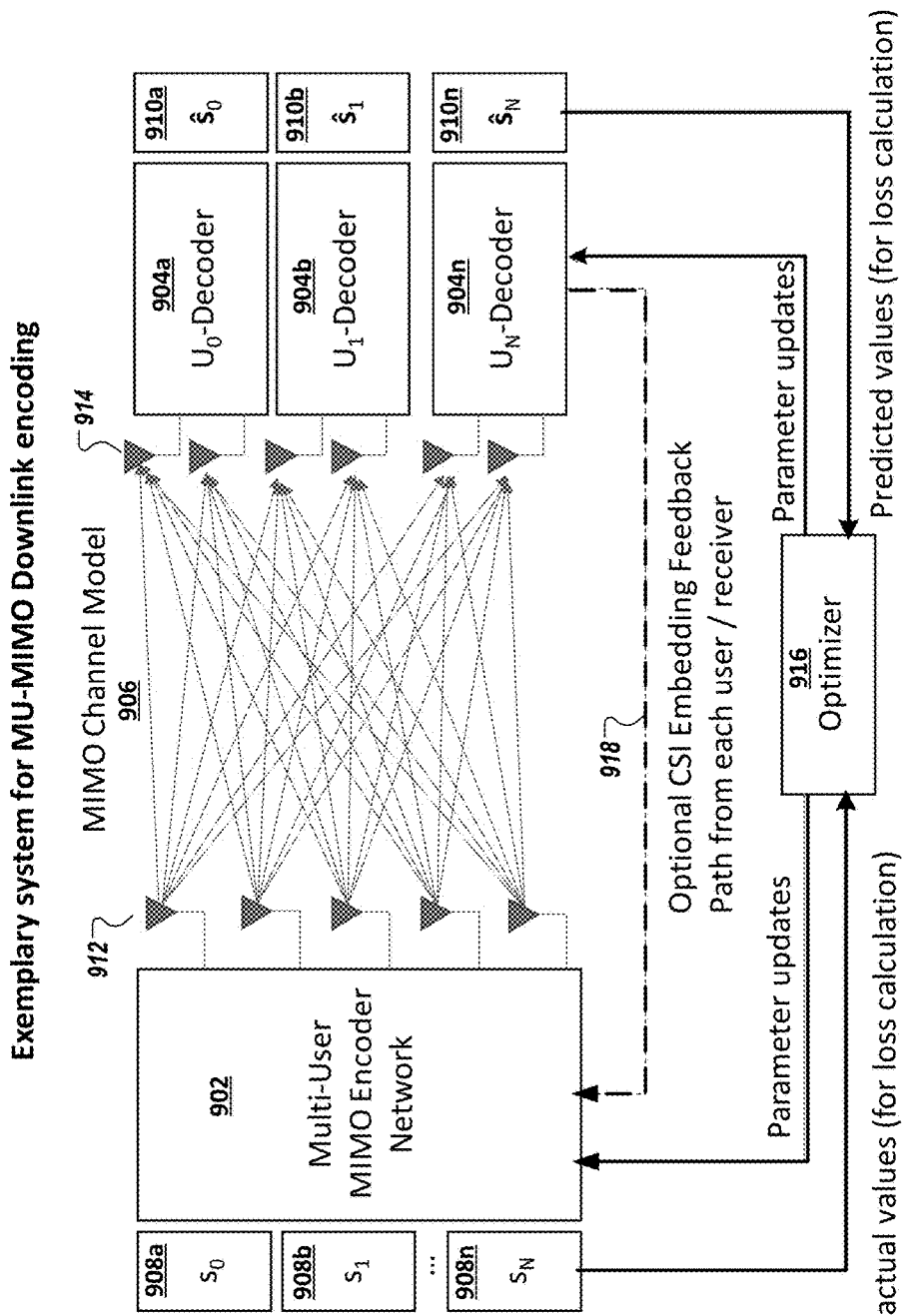
FIG. 9A illustrates an example of deploying a multi-user downlink system that implements a single machine-learning encoder network and multiple decoders to perform learned communication over a real-world MIMO channel with multi-antenna transceivers.

FIG. 9A illustrates an example of deploying a multi-user downlink system that implements a single machine-learning encoder network and multiple decoders to perform learned communication over a real-world RF channel with multi-antenna transceivers. In some implementations, technique disclosed herein may be utilized to implement a multi-user MIMO system, wherein different information from multiple users (each utilizing multiple-antenna transceivers) are communicated over a common MIMO channel. The system may be trained to learn encoding and/or decoding techniques for each user that achieve a balance of competing objectives for the multiple users sharing the same MIMO channel.

The example in FIG. 9A illustrates one example of a multi-user implementation, namely a downlink scenario where a base station implements a single multi-user encoder 902 to encode input information 908a, 908b, . . . , 908n corresponding to multiple mobile users and generate a plurality of RF signals 912 over the MIMO channel 906. Multiple decoders 904a, 904b, . . . , 904n may be trained and implemented corresponding to multiple devices at the multiple mobile users. Each of the decoders 904a, 904b, . . . , 904n implements multiple receive antennas, which receive the received RF signals 914 which are used to generate reconstructed information 910a, 910b, . . . , 910n for each of the multiple users. In the general case, multiple base stations can also be combined using one or more multi-user encoder networks in order to implement a distributed multi-user MIMO downlink system.

During training, an optimizer 916 may be implemented to update at least one machine-learning network in the encoder 902 and/or decoders 904a, 904b, . . . , 904n to learn suitable encoding/decoding/CSI estimation techniques for the MIMO channel 906. In closed-loop scenarios, the CSI estimation may utilize CSI 918 that is either generated at the encoder 902 or fed back from the decoders 904a, 904b, . . . , 904n to the encoder 902.

Figure 9B:
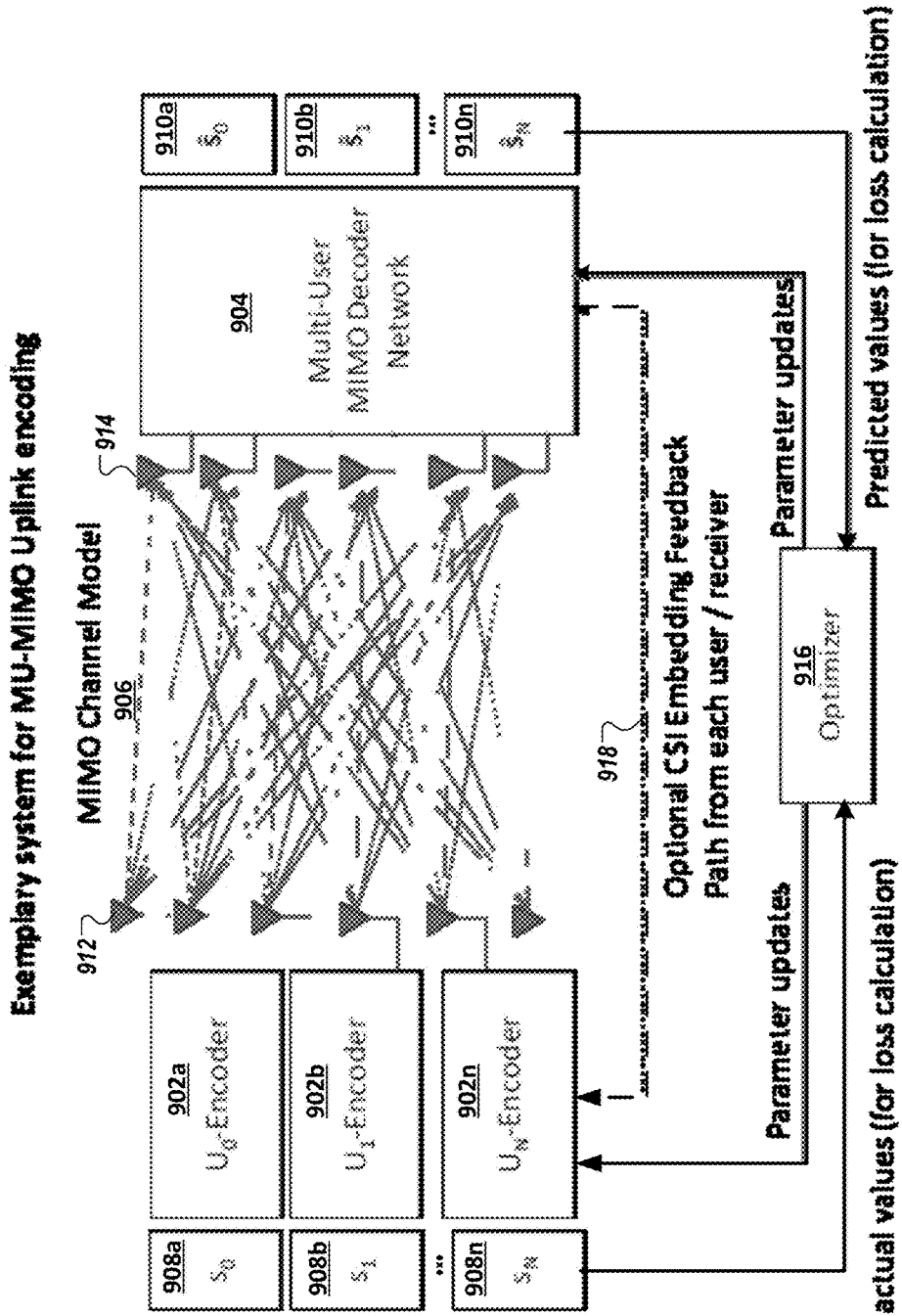
FIG. 9B illustrates an example of deploying a multi-user uplink system that implements multiple encoders and a single machine-learning decoder to perform learned communication over a real-world MIMO channel with multi-antenna transceivers.

FIG. 9B illustrates another example of a multi-user implementation, namely an uplink scenario where multiple mobile users transmit to a single base station. The multi-user uplink system implements multiple encoders 902a, 902b, . . . , 902n at multiple devices of different users to encode input information 908a, 908b, . . . , 908n, where each device utilizes multiple antennas to generate a plurality of RF signals 912 over the MIMO channel 906. A single machine-learning decoder 904 is implemented to receive RF signals 914 which are used to generate reconstructed information 910a, 910b, . . . , 910n for each of the multiple users. In the general case, multiple base stations can also be combined using one or more multi-user decoder networks in order to implement a distributed multi-user MIMO uplink system.

During training, an optimizer 916 may be implemented to update at least one machine-learning network in the encoders 902a, 902b, . . . , 902n and/or the decoder 904 to learn suitable encoding/decoding/CSI estimation techniques for the MIMO channel 906. In closed-loop scenarios, the CSI estimation may utilize CSI 918 that is either generated at each of the encoders 902a, 902b, . . . , 902n or fed back from the decoder 904 to each of the encoders 902a, 902b, . . . , 902n.

Figure 10:
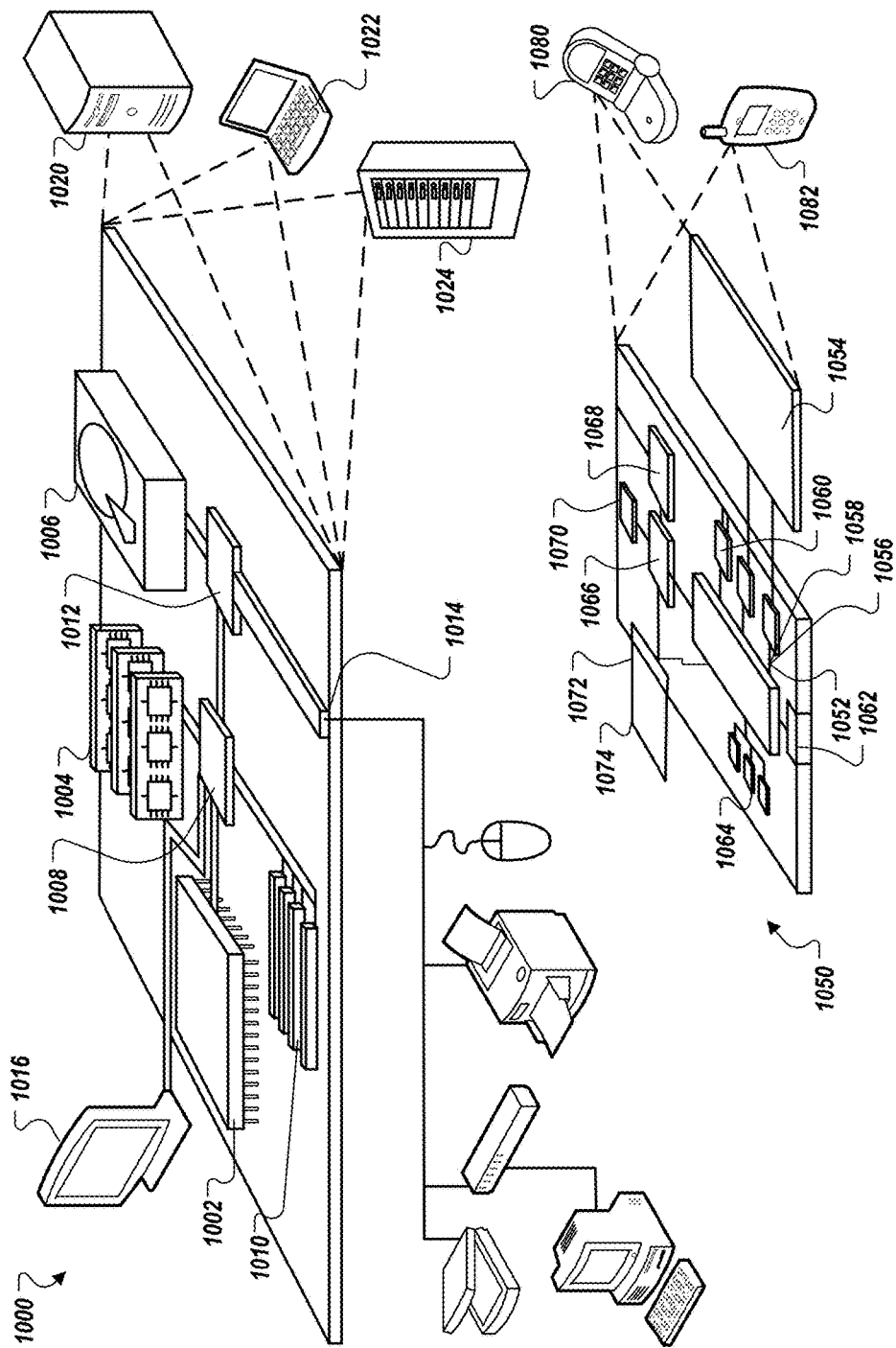
FIG. 10 is a diagram illustrating an example of a computing system that may be used to implement one or more components of a system that performs learned communication over MIMO channels.

FIG. 10 is a diagram illustrating an example of a computing system that may be used to implement one or more components of a system that performs learned communication over RF channels. The computing system includes computing device 1000 and a mobile computing device 1050 that can be used to implement the techniques described herein. For example, one or more parts of an encoder machine-learning network system or a decoder machine-learning network system could be an example of the system 1000 described here, such as a computer system implemented in any of the machine-learning networks, devices that access information from the machine-learning networks, or a server that accesses or stores information regarding the encoding and decoding performed by the machine-learning networks.

The computing device 1000 is intended to represent various forms of digital computers, such as laptops, desktops, workstations, personal digital assistants, servers, blade servers, mainframes, and other appropriate computers. The mobile computing device 1050 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 1000 includes a processor 1002, a memory 1004, a storage device 1006, a high-speed interface 1008 connecting to the memory 1004 and multiple high-speed expansion ports 1010, and a low-speed interface 1012 connecting to a low-speed expansion port 1014 and the storage device 1006. Each of the processor 1002, the memory 1004, the storage device 1006, the high-speed interface 1008, the high-speed expansion ports 1010, and the low-speed interface 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as a display 1016 coupled to the high-speed interface 1008. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 1002 is a single-threaded processor. In some implementations, the processor 1002 is a multi-threaded processor. In some implementations, the processor 1002 is a quantum computer.

The memory 1004 stores information within the computing device 1000. In some implementations, the memory 1004 is a volatile memory unit or units. In some implementations, the memory 1004 is a non-volatile memory unit or units. The memory 1004 may also be another form of computer-readable medium, such as a magnetic or optical disk.

The storage device 1006 is capable of providing mass storage for the computing device 1000. In some implementations, the storage device 1006 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1002), perform one or more methods, such as those described above. The instructions can also be stored by one or more storage devices such as computer- or machine-readable mediums (for example, the memory 1004, the storage device 1006, or memory on the processor 1002). The high-speed interface 1008 manages bandwidth-intensive operations for the computing device 1000, while the low-speed interface 1012 manages lower bandwidth-intensive operations. Such allocation of functions is an example only. In some implementations, the high-speed interface 1008 is coupled to the memory 1004, the display 1016 (e.g., through a graphics processor or accelerator), and to the high-speed expansion ports 1010, which may accept various expansion cards (not shown). In the implementation, the low-speed interface 1012 is coupled to the storage device 1006 and the low-speed expansion port 1014. The low-speed expansion port 1014, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. In addition, it may be implemented in a personal computer such as a laptop computer 1022. It may also be implemented as part of a rack server system 1024. Alternatively, components from the computing device 1000 may be combined with other components in a mobile device (not shown), such as a mobile computing device 1050. Each of such devices may include one or more of the computing device 1000 and the mobile computing device 1050, and an entire system may be made up of multiple computing devices communicating with each other.

The mobile computing device 1050 includes a processor 1052, a memory 1064, an input/output device such as a display 1054, a communication interface 1066, and a transceiver 1068, among other components. The mobile computing device 1050 may also be provided with a storage device, such as a micro-drive or other device, to provide additional storage. Each of the processor 1052, the memory 1064, the display 1054, the communication interface 1066, and the transceiver 1068, are interconnected using various buses, and several of the components may be mounted on a common motherboard or in other manners as appropriate.

The processor 1052 can execute instructions within the mobile computing device 1050, including instructions stored in the memory 1064. The processor 1052 may be implemented as a chipset of chips that include separate and multiple analog and digital processors. The processor 1052 may provide, for example, for coordination of the other components of the mobile computing device 1050, such as control of user interfaces, applications run by the mobile computing device 1050, and wireless communication by the mobile computing device 1050.

The processor 1052 may communicate with a user through a control interface 1058 and a display interface 1056 coupled to the display 1054. The display 1054 may be, for example, a TFT (Thin-Film-Transistor Liquid Crystal Display) display or an OLED (Organic Light Emitting Diode) display, or other appropriate display technology. The display interface 1056 may include appropriate circuitry for driving the display 1054 to present graphical and other information to a user. The control interface 1058 may receive commands from a user and convert them for submission to the processor 1052. In addition, an external interface 1062 may provide communication with the processor 1052, so as to enable near area communication of the mobile computing device 1050 with other devices. The external interface 1062 may provide, for example, for wired communication in some implementations, or for wireless communication in other implementations, and multiple interfaces may also be used.

The memory 1064 stores information within the mobile computing device 1050. The memory 1064 can be implemented as one or more of a computer-readable medium or media, a volatile memory unit or units, or a non-volatile memory unit or units. An expansion memory 1074 may also be provided and connected to the mobile computing device 1050 through an expansion interface 1072, which may include, for example, a SIMM (Single In Line Memory Module) card interface. The expansion memory 1074 may provide extra storage space for the mobile computing device 1050, or may also store applications or other information for the mobile computing device 1050. Specifically, the expansion memory 1074 may include instructions to carry out or supplement the processes described above, and may include secure information also. Thus, for example, the expansion memory 1074 may be provide as a security module for the mobile computing device 1050, and may be programmed with instructions that permit secure use of the mobile computing device 1050. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier such that the instructions, when executed by one or more processing devices (for example, processor 1052), perform one or more methods, such as those described above. The instructions can also be stored by one or more storage devices, such as one or more computer- or machine-readable mediums (for example, the memory 1064, the expansion memory 1074, or memory on the processor 1052). In some implementations, the instructions can be received in a propagated signal, for example, over the transceiver 1068 or the external interface 1062.

The mobile computing device 1050 may communicate wirelessly through the communication interface 1066, which may include digital signal processing circuitry where necessary. The communication interface 1066 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 1068 using a radio frequency. In addition, short-range communication may occur, such as using a Bluetooth, Wi-Fi, or other such transceiver (not shown). In addition, a GPS (Global Positioning System) receiver module 1070 may provide additional navigation- and location-related wireless data to the mobile computing device 1050, which may be used as appropriate by applications running on the mobile computing device 1050.

The mobile computing device 1050 may also communicate audibly using an audio codec 1060, which may receive spoken information from a user and convert it to usable digital information. The audio codec 1060 may likewise generate audible sound for a user, such as through a speaker, e.g., in a handset of the mobile computing device 1050. Such sound may include sound from voice telephone calls, may include recorded sound (e.g., voice messages, music files, etc.) and may also include sound generated by applications operating on the mobile computing device 1050.

The mobile computing device 1050 may be implemented in a number of different forms, as shown in the figure. For example, it may be implemented as a cellular telephone 1080. It may also be implemented as part of a smart-phone 1082, personal digital assistant, or other similar mobile device.

The term "system" as used in this disclosure may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general-purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

The invention claimed is:

1. A method performed by at least one processor to train at least one machine-learning network to communicate using multiple transmit antennas and multiple receive antennas over a multi-input-multi-output (MIMO) communication channel, the method comprising:
   determining a transmitter and a receiver, at least one of which is configured to implement at least one machine-learning network;
   determining a MIMO channel model that represents transmission effects of a MIMO communication channel;
   determining first information for transmission over the MIMO channel model;
   using the transmitter to process the first information and generate a plurality of first RF signals representing inputs to the MIMO channel model;
   determining a plurality of second RF signals representing outputs of the MIMO channel model, each second RF signal of the plurality of second RF signals representing aggregated reception of the plurality of first RF signals having been altered by transmission through the MIMO channel model;

using the receiver to process the plurality of second RF signals and generate second information as a reconstruction of the first information;
calculating a measure of distance between the second information and the first information; and
updating the at least one machine-learning network based on the measure of distance between the second information and the first information.

2. The method of claim 1,
wherein using the transmitter to process the first information and generate the plurality of first RF signals comprises:
determining, from the first information, a plurality of first information portions; and
generating, based at least in part on the plurality of first information portions, the plurality of first RF signals with each first RF signal corresponding to a respective one of the plurality of first information portions, and
wherein using the receiver to process the plurality of second RF signals and generate the second information as the reconstruction of the first information comprises:
determining, from the plurality of second RF signals, a plurality of second information portions with each second information portion corresponding to a respective one of the plurality of second RF signals; and
generating, from the plurality of second information portions, the second information.

3. The method of claim 1, further comprising:
determining channel state information (CSI) that indicates at least one of a state of the MIMO channel model, or spatial information or scheduling information regarding multiple users of the MIMO channel model; and
based on determining the CSI, performing at least one of (i) using the transmitter to generate the plurality of first RF signals based on the CSI and the first information, or (ii) updating the MIMO channel model based on the CSI.

4. The method of claim 3, wherein determining the CSI comprises:
determining channel information regarding the at least one of a state of the MIMO channel model or spatial information or scheduling information regarding multiple users of a MIMO communication channel; and
generating the CSI as a compact representation of the channel information by quantizing or classifying the channel information into one of a discrete number of states or finite number of bits as the CSI.

5. The method of claim 1, wherein updating the at least one machine-learning network based on the measure of distance between the second information and the first information comprises:
determining an objective function comprising the measure of distance between the second information and the first information;
calculating a rate of change of the objective function relative to variations in the at least one machine-learning network;
selecting, based on the calculated rate of change of the objective function, a variation for the at least one machine-learning network; and
updating the at least one machine-learning network based on the selected variation for the machine-learning network.

6. The method of claim 1, wherein the measure of distance between the second information and the first information comprises at least one of (i) a cross-entropy between the second information and the first information or other probabilistic measure of distance, or (ii) a geometric distance metric between the second information and the first information.

7. The method of claim 1, wherein the transmitter comprises an encoder machine-learning network and the receiver comprises a decoder machine-learning network that are jointly trained as an auto-encoder to learn communication over a MIMO communication channel, and
wherein the auto-encoder comprises at least one channel-modeling layer representing effects of the MIMO channel model or other impairments on transmitted waveforms.

8. The method of claim 7, wherein the at least one channel-modeling layer represents at least one of (i) additive Gaussian thermal noise in the MIMO communication channel, (ii) delay spread caused by time-varying effects of the MIMO communication channel, (iii) phase noise or other distortions caused by transmission and reception over the MIMO communication channel or hardware, or (iv) offsets in phase, frequency, rate, or timing caused by transmission and reception over the MIMO communication channel.

9. The method of claim 1, wherein the at least one machine-learning network comprises at least one of a deep dense neural network (DNN), a convolutional neural network (CNN), or a recurrent neural network (RNN) comprising parametric multiplications, additions, and non-linearities.

10. The method of claim 1, further comprising:
training the at least one machine-learning network to communicate over a multi-user MIMO communication channel utilized by multiple users,
wherein the transmitter comprises one or more encoder machine-learning networks, and the receiver comprises one or more decoder machine-learning networks,
wherein using the transmitter to process the first information and generate the plurality of first RF signals comprises: using the one or more encoder machine-learning networks to (i) process at least a first portion of the first information to generate a first subset of the plurality of first RF signals; and (ii) process at least a second portion of the first information and generate a second subset of the plurality of first RF signals,
wherein using the receiver to process the plurality of second RF signals and generate second information as a reconstruction of the first information comprises: using the one or more decoder machine-learning networks to (i) process a first subset of the plurality of second RF signals and generate at least a first portion of the second information as a reconstruction of the first portion of the first information; and (ii) process a second subset of the plurality of second RF signals and generate at least a second portion of the second information as a reconstruction of the second portion of the first information,
wherein calculating the measure of distance between the second information and the first information comprises: (i) calculating a first measure of distance between the first portion of the second information and the first portion of the first information, and (ii) calculating a second measure of distance between the second portion of the second information and the second portion of the first information, and
wherein updating the at least one machine-learning network based on the measure of distance between the second information and the first information comprises:

based on the first measure of distance and the second measure of distance, updating at least one of (i) the one or more encoder machine-learning networks, or (ii) the one or more decoder machine-learning networks.

11. A system comprising:
at least one processor; and
at least one computer memory coupled to the at least one processor having stored thereon instructions which, when executed by the at least one processor, cause the at least one processor to perform operations to train at least one machine-learning network to communicate using multiple transmit antennas and multiple receive antennas over a multi-input-multi-output (MIMO) communication channel, the operations comprising:
determining a transmitter and a receiver, at least one of which is configured to implement at least one machine-learning network;
determining a MIMO channel model that represents transmission effects of a MIMO communication channel;
determining first information for transmission over the MIMO channel model;
using the transmitter to process the first information and generate a plurality of first RF signals representing inputs to a MIMO channel model;
determining a plurality of second RF signals representing outputs of the MIMO channel model, each second RF signal of the plurality of second RF signals representing aggregated reception of the plurality of first RF signals having been altered by transmission through the MIMO channel model;
using the receiver to process the plurality of second RF signals and generate second information as a reconstruction of the first information;
calculating a measure of distance between the second information and the first information; and
updating the at least one machine-learning network based on the measure of distance between the second information and the first information.

12. The system of claim 11, wherein using the transmitter to process the first information and generate the plurality of first RF signals comprises:
determining, from the first information, a plurality of first information portions; and
generating, based at least in part on the plurality of first information portions, the plurality of first RF signals with each first RF signal corresponding to a respective one of the plurality of first information portions, and
wherein using the receiver to process the plurality of second RF signals and generate the second information as the reconstruction of the first information comprises:
determining, from the plurality of second RF signals, a plurality of second information portions with each second information portion corresponding to a respective one of the plurality of second RF signals; and
generating, from the plurality of second information portions, the second information.

13. The system of claim 11, wherein the operations further comprise:
determining channel state information (CSI) that indicates at least one of a state of the MIMO channel model, or spatial information or scheduling information regarding multiple users of the MIMO channel model; and
based on determining the CSI, performing at least one of (i) using the transmitter to generate the plurality of first RF signals based on the CSI and the first information, or (ii) updating the MIMO channel model based on the CSI.

14. The system of claim 13, wherein determining the CSI comprises:
determining channel information regarding the at least one of a state of the MIMO channel model or spatial information or scheduling information regarding multiple users of a MIMO communication channel; and
generating the CSI as a compact representation of the channel information by quantizing or classifying the channel information into one of a discrete number of states or finite number of bits as the CSI.

15. The system of claim 11, wherein updating the at least one machine-learning network based on the measure of distance between the second information and the first information comprises:
determining an objective function comprising the measure of distance between the second information and the first information;
calculating a rate of change of the objective function relative to variations in the at least one machine-learning network;
selecting, based on the calculated rate of change of the objective function, a variation for the at least one machine-learning network; and
updating the at least one machine-learning network based on the selected variation for the machine-learning network.

16. The system of claim 11, wherein the measure of distance between the second information and the first information comprises at least one of (i) a cross-entropy between the second information and the first information or other probabilistic measure of distance, or (ii) a geometric distance metric between the second information and the first information.

17. The system of claim 11, wherein the transmitter comprises an encoder machine-learning network and the receiver comprises a decoder machine-learning network that are jointly trained as an auto-encoder to learn communication over a MIMO communication channel, and
wherein the auto-encoder comprises at least one channel-modeling layer representing effects of the MIMO channel model or other impairments on transmitted waveforms.

18. The system of claim 17, wherein the at least one channel-modeling layer represents at least one of (i) additive Gaussian thermal noise in the MIMO communication channel, (ii) delay spread caused by time-varying effects of the MIMO communication channel, (iii) phase noise or other distortions caused by transmission and reception over the MIMO communication channel or hardware, or (iv) offsets in phase, frequency, rate, or timing caused by transmission and reception over the MIMO communication channel.

19. The system of claim 11, wherein the at least one machine-learning network comprises at least one of a deep dense neural network (DNN), a convolutional neural network (CNN), or a recurrent neural network (RNN) comprising parametric multiplications, additions, and non-linearities.

20. The system of claim 11, wherein the operations further comprise:
training the at least one machine-learning network to communicate over a multi-user MIMO communication channel utilized by multiple users, wherein the transmitter comprises one or more encoder machine-learning networks, and the receiver comprises one or more decoder machine-learning networks, wherein using the transmitter to process the first information and generate the plurality of first RF signals comprises: using the one or more encoder machine-learning networks to (i) process at least a first portion of the first information to generate a first subset of the plurality of first RF signals; and (ii) process at least a second portion of the first information and generate a second subset of the plurality of first RF signals, wherein using the receiver to process the plurality of second RF signals and generate second information as a reconstruction of the first information comprises: using the one or more decoder machine-learning networks to (i) process a first subset of the plurality of second RF signals and generate at least a first portion of the second information as a reconstruction of the first portion of the first information; and (ii) process a second subset of the plurality of second RF signals and generate at least a second portion of the second information as a reconstruction of the second portion of the first information, wherein calculating the measure of distance between the second information and the first information comprises: (i) calculating a first measure of distance between the first portion of the second information and the first portion of the first information, and (ii) calculating a second measure of distance between the second portion of the second information and the second portion of the first information, and wherein updating the at least one machine-learning network based on the measure of distance between the second information and the first information comprises: based on the first measure of distance and the second measure of distance, updating at least one of (i) the one or more encoder machine-learning networks, or (ii) the one or more decoder machine-learning networks.

* * * * *